United States Patent
Zhang

(10) Patent No.: US 12,526,518 B2
(45) Date of Patent: Jan. 13, 2026

(54) SHOOTING METHOD AND RELATED DEVICE

(71) Applicant: HONOR DEVICE CO., LTD., Shenzhen (CN)

(72) Inventor: Dan Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 96 days.

(21) Appl. No.: 18/700,386

(22) PCT Filed: May 5, 2023

(86) PCT No.: PCT/CN2023/092374
§ 371 (c)(1),
(2) Date: Apr. 11, 2024

(87) PCT Pub. No.: WO2023/231697
PCT Pub. Date: Jul. 12, 2023

(65) Prior Publication Data
US 2025/0024146 A1  Jan. 16, 2025

(30) Foreign Application Priority Data
May 30, 2022  (CN) .......................... 202210603528.2

(51) Int. Cl.
*H04N 23/67* (2023.01)
*G06T 9/00* (2006.01)
(Continued)

(52) U.S. Cl.
CPC ............. *H04N 23/675* (2023.01); *G06T 9/00* (2013.01); *H04N 23/611* (2023.01); *H04N 23/682* (2023.01)

(58) Field of Classification Search
CPC .... H04N 5/2624; H04N 5/772; H04N 23/675; H04N 23/611; H04N 23/682;
(Continued)

(56) References Cited

U.S. PATENT DOCUMENTS 7,424,218 B2 * 9/2008 Baudisch ............... G03B 17/18
396/374
9,344,618 B2 * 5/2016 Min ....................... H04N 23/45
(Continued)

FOREIGN PATENT DOCUMENTS

| CN | 110072070 A | 7/2019 |
|---|---|---|
| CN | 110650291 A | 1/2020 |

(Continued)

*Primary Examiner* — Pritham D Prabhakher

(57) ABSTRACT

This application provides a shooting method and a related device. The electronic device may output a RAW image through the camera lens, and divide the image into three paths of data streams through an image processor. The three paths of data streams are data streams of a panorama path, a focus tracking path, and a detection path respectively. After stabilization processing, the data stream of the panorama path is used to display and preview a large window of a camera application interface. After human body detection and successful focus tracking, information about a human body cropping frame may be output, through the data stream of the detection path, to the focus tracking path for cropping a human body frame. After stabilization processing, smoothing processing, and cropping processing, the data stream of the focus tracking path may be used to display and preview a small window of the camera application interface.

20 Claims, 31 Drawing Sheets

(51) Int. Cl.
*H04N 23/611* (2023.01)
*H04N 23/68* (2023.01)

(58) Field of Classification Search
CPC .............. H04N 23/635; H04N 23/632; H04N 9/8227; G06T 9/00; H04M 1/72439; H04M 2250/52
USPC ........................................................ 348/345
See application file for complete search history.

(56) References Cited

U.S. PATENT DOCUMENTS

| | | | |
|---|---|---|---|
| 9,860,411 B2* | 1/2018 | Ju | H04N 23/633 |
| 10,341,529 B2 | 7/2019 | Cho et al. | |
| 10,423,194 B2* | 9/2019 | Lee | H04M 1/72403 |
| 10,699,747 B2* | 6/2020 | Knutt | H04N 5/77 |
| 11,238,898 B2* | 2/2022 | Knutt | G11B 31/006 |
| 11,451,706 B2* | 9/2022 | Yang | H04N 23/80 |
| 11,700,452 B2 | 7/2023 | Xu et al. | |
| 11,765,463 B2 | 9/2023 | Li et al. | |
| 11,832,022 B2 | 11/2023 | Cui | |
| 2007/0025723 A1 | 2/2007 | Baudisch et al. | |
| 2013/0155308 A1* | 6/2013 | Wu | H04N 23/611 348/333.05 |
| 2015/0009372 A1 | 1/2015 | Min et al. | |
| 2015/0350533 A1* | 12/2015 | Harris | H04N 23/73 348/362 |
| 2017/0134605 A1* | 5/2017 | Ju | G06F 3/048 |
| 2017/0180680 A1 | 6/2017 | Yu | |
| 2018/0005665 A1* | 1/2018 | Knutt | H04N 5/91 |
| 2018/0069983 A1* | 3/2018 | Cho | H04N 23/632 |
| 2018/0196472 A1 | 7/2018 | Lee | |
| 2020/0257436 A1* | 8/2020 | Yun | H04M 1/725 |
| 2020/0327908 A1* | 10/2020 | Knutt | G11B 31/006 |
| 2021/0014413 A1* | 1/2021 | Yang | H04N 5/265 |
| 2022/0159183 A1* | 5/2022 | Li | H04N 23/635 |
| 2022/0360715 A1* | 11/2022 | Xu | H04N 23/682 |
| 2023/0116044 A1 | 4/2023 | Han | |
| 2023/0156144 A1* | 5/2023 | Cui | H04N 5/76 386/248 |
| 2023/0230276 A1 | 7/2023 | Shen | |
| 2023/0421900 A1 | 12/2023 | Huang et al. | |

FOREIGN PATENT DOCUMENTS

| | | |
|---|---|---|
| CN | 112261218 A | 1/2021 |
| CN | 112825543 A | 5/2021 |
| CN | 112954219 A | 6/2021 |
| CN | 113365013 A | 9/2021 |
| CN | 113873166 A | 12/2021 |
| CN | 114339051 A | 4/2022 |
| CN | 114390213 A | 4/2022 |
| CN | 114422692 A | 4/2022 |
| CN | 114466128 A | 5/2022 |
| CN | 115484403 A | 12/2022 |
| CN | 116055868 A | 5/2023 |
| EP | 3291533 A1 | 3/2018 |
| EP | 4387253 A1 | 6/2024 |
| KR | 20160136636 A | 11/2016 |
| WO | 2018166069 A1 | 9/2018 |
| WO | 2020186969 A1 | 9/2020 |
| WO | 2021032117 A1 | 2/2021 |
| WO | 2021213477 A1 | 10/2021 |
| WO | 2022063023 A1 | 3/2022 |
| WO | 2022068537 A1 | 4/2022 |

\* cited by examiner

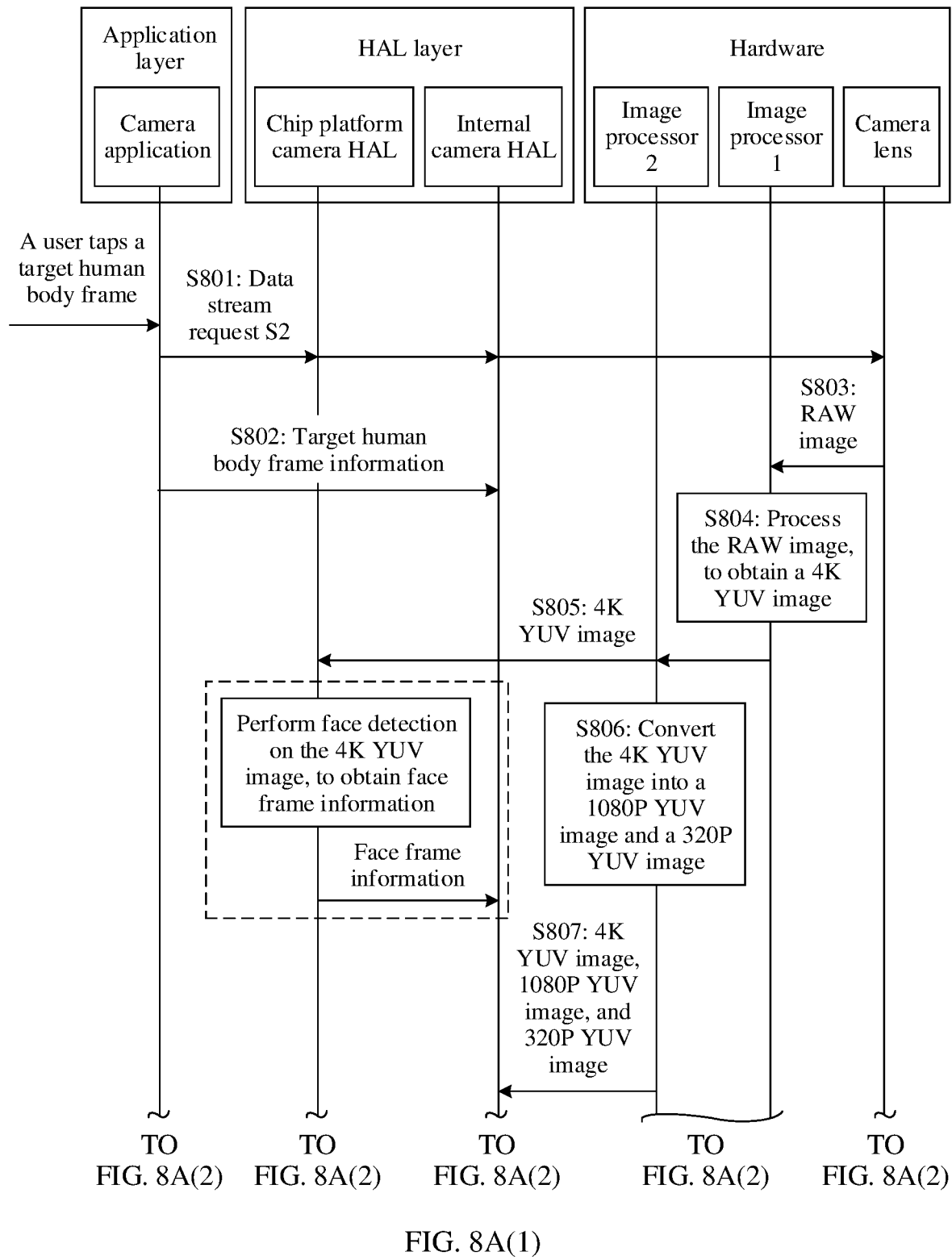
FIG. 8A(1)

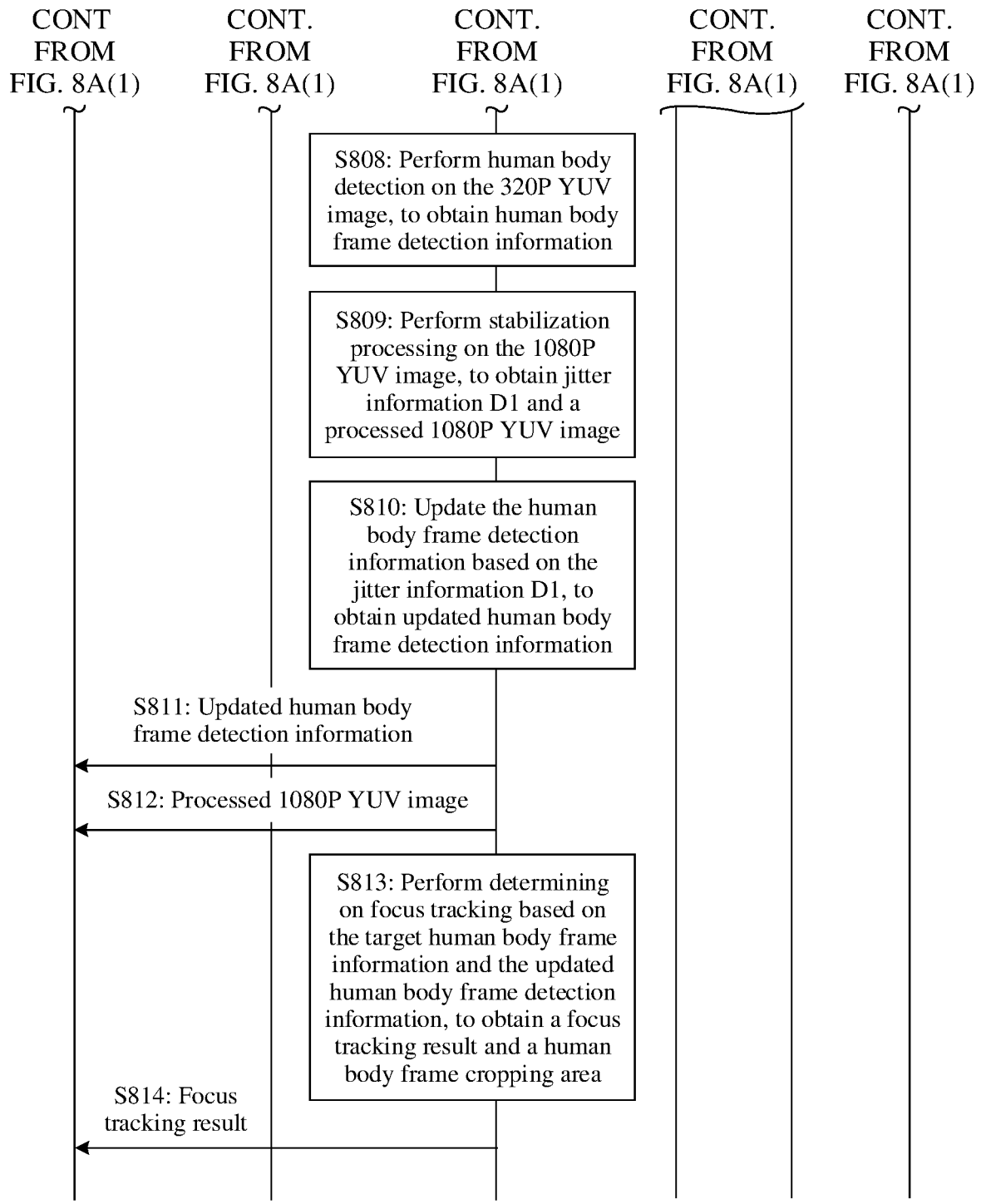
FIG. 8A(2)

SHOOTING METHOD AND RELATED DEVICE

CROSS-REFERENCE TO RELATED APPLICATIONS

This application is a national stage of International Application No. PCT/CN2023/092374, filed on May 5, 2023, which claims priority to Chinese Patent Application No. 202210603528.2, filed on May 30, 2022. The disclosures of each of the aforementioned applications are hereby incorporated by reference in their entireties.

TECHNICAL FIELD

This application relates to the field of terminal technologies, and in particular to a shooting method and a related device.

BACKGROUND

With the development of terminal technologies, more possibilities are provided for video shooting. For example, persons may implement automatic focus tracking on shot objects such as a face, a person, and a pet through terminal devices such as a mobile phone, to resolve a problem of out-of-focus or focus shifting that is caused when the shot object is not automatically focused during movement of the shot object.

SUMMARY

This application provides a shooting method and a related device. The shooting method may be applied to an electronic device with a camera lens. In the shooting method, the electronic device may output a RAW image through the camera lens, and divide the image into three paths of data streams through an image processor. The three paths of data streams are respectively data streams of a panorama path, a focus tracking path, and a detection path respectively. After stabilization processing, the data stream of the panorama path is used to display and preview a large window of a camera application interface. After human body detection and successful focus tracking, information about a human body cropping frame may be output, through the data stream of the detection path, to the focus tracking path for cropping a human body frame. After stabilization processing, smoothing processing, and cropping processing, the data stream of the focus tracking path may be used to display and preview a small window in the camera application interface. It may be understood that processing on the three paths of data streams is performed, so that the electronic device can simultaneously perform recording in the large window and the small window, that is, simultaneously record a panoramic picture and a close-up picture. In addition, related processing on the three data streams is performed in a camera software architecture, and does not depend on a platform. This greatly facilitates transplantation, development, and reuse at another platform at a later stage.

According to a first aspect, this application provides a shooting method. The method may be applied to an electronic device with a camera lens. The method may include: displaying a shooting interface, where the shooting interface includes a preview area, and the shooting interface includes a first image and a first control; detecting a first operation performed on the first control; in response to the first operation, displaying one or more markers on the first image, where the one or more markers are used to mark a shot object in the first image; detecting a second operation performed on a first marker; in response to the second operation, displaying a first window on the preview area of the shooting interface, where the first window displays a close-up image of the first shot object, and the shooting interface may further include a recording control; detecting, by the electronic device, a third operation performed on the recording control; and in response to the third operation, displaying a first recording time on the shooting interface of the electronic device, where the first window displays a second recording time. The preview area is used to display an image captured by the camera lens. The first marker is used to mark a first shot object.

In the technical solution provided in this application, in a shooting scenario in which a plurality of shot objects are in a same box, the electronic device may perform focus tracking for one of the shot objects, display an original image on a large window (that is, the preview area), and display a close-up image of a focus tracking target on a small window (that is, the first window). It may be understood that in comparison with the close-up image of the focus tracking target, the original image displays richer content. This method can simultaneously meet different shooting requirements of a user, and enhance user experience.

In the technical solution provided in this application, the user may trigger the large window and the small window to simultaneously record a video, and accordingly obtain the video. In other words, the electronic device may simultaneously display the large window and the small window, and separately record the video. In the method, the user can simultaneously obtain a raw video and a close-up video, without separately recording the close-up video of the shot object. This improves shooting experience.

With reference to the first aspect, in a possible implementation, before the detecting a second operation performed on a first marker, the method further includes: The electronic device processes a RAW image captured by the camera lens to obtain a second image and a third image; and performs stabilization processing on the second image, to obtain first jitter information, where a size of the second image is larger than a size of the third image, and the first jitter information includes a first jitter offset and a first jitter direction. The electronic device further performs object recognition on the third image according to an object recognition algorithm, to obtain first object recognition information. It may be understood that the first object recognition information includes coordinates of one or more shot objects. Further, the electronic device further processes the first object recognition information based on the first jitter information, to obtain second object recognition information. It may be understood that coordinates of one or more shot objects included in the second object recognition information are used to display the one or more markers on the first image.

In the technical solution provided in this application, the electronic device may recognize the shot object, and mark the shot object on the shooting interface. In this process, the electronic device may perform jitter correction. This improves accuracy of a marked position corresponding to the shot object. In addition, the electronic device processes an image with a different size. This saves processing time while clarity of a final displayed image is ensured.

It may be understood that, the first control may be a control in a focus tracking mode. The recording control may be a video recording start control. The second image may be an image I1 in a following embodiment. The third image may be an image I3 in a following embodiment. The object recognition algorithm may be a human body detection algorithm. Details may be referred to a following embodiment and not be described herein. The first object recognition information may be human body frame detection information in a following embodiment. The second object recognition information may be updated human body frame detection information in a following embodiment. The marker may be a human body frame. The first jitter information may be jitter information D1 in a following embodiment.

With reference to the first aspect, in a possible implementation, after the detecting a second operation performed on a first marker, the method includes: The electronic device may obtain operation information of the second operation; determine a focus tracking target and coordinates of the focus tracking target based on the operation information of the second operation and the second object recognition information; and determine a first cropping area based on the coordinates of the focus tracking target. It may be understood that the focus tracking target is the first shot object. Coordinates of the first shot object match the operation information of the second operation. The close-up image is an image generated based on the first cropping area.

In the technical solution provided in this application, after the user selects the focus tracking target, the electronic device may look up information related to a second operation in object recognition information. If there is the information (for example, coordinates of a shot object included in the object recognition information is consistent with coordinates corresponding to the operation information of the second operation) related to the second operation in the object recognition information, the electronic device may determine the focus tracking target and the coordinates thereof, and determine the first cropping area based on the coordinates of the focus tracking target. It may be understood that the first cropping area corresponds to a position of the focus tracking target on the image.

It may be understood that the first cropping area may be a human body frame cropping area in the following embodiment.

In some embodiments of this application, coincidence between the coordinates of the focus tracking target and coordinates in the first cropping area is within a specific range, for example, 85% to 100%.

In some embodiments of this application, the marker may be displayed in a center area of the shot object. Coordinates of the marker corresponding to the shot object may include some or all of the coordinates of the shot object.

It may be understood that the second operation may be operations such as a tap, a sound, and a gesture. This is not limited in this application. In some embodiments of this application, the operation information of the second operation may be coordinates of a position at which the user taps.

With reference to the first aspect, in a possible implementation, the method may further include: The electronic device processes the RAW image captured by the camera lens to obtain a fourth image, and performs stabilization processing on the fourth image, to obtain second jitter information. The second jitter information includes a second jitter offset and a second jitter direction. The electronic device may further determine multiple information based on the fourth image and the third image. The electronic device may further process the first cropping area based on the second jitter information and the multiple information, to obtain a second cropping area, and crop the fourth image based on coordinates included in the second cropping area, to obtain a fifth image. The multiple information includes a ratio of the fourth image to the third image. The close-up image is an image generated based on the fifth image.

In the technical solution provided in this application, the electronic device may perform jitter correction and coordinate mapping on the first cropping area, to enable a final displayed close-up image to reflect the focus tracking target more accurately. This avoids a problem that the close-up image includes only a part of the focus tracking target because of an error in the cropping area.

In some embodiments of this application, a size of the fourth image is larger than the size of the third image.

In some embodiments of this application, the size of the fourth image is larger than the size of the second image.

It may be understood that the fourth image may be an image I2 in a following embodiment. The second cropping area may be an updated human body frame cropping area in a following embodiment. The second jitter information may be jitter information D2 in a following embodiment.

With reference to the first aspect, in a possible implementation, that the electronic device processes the first cropping area based on the second jitter information and the multiple information, to obtain a second cropping area may specifically include: The electronic device performs, based on the second jitter offset, offset processing on coordinates included in the first cropping area in a direction opposite to the second jitter direction, to obtain a third cropping area; and zooms in the third cropping area based on the multiple information, to obtain the second cropping area.

It may be understood that the electronic device zooms in the third cropping area based on the multiple information may be understood as mapping coordinates included in the third cropping area to an image with a larger size.

With reference to the first aspect, in a possible implementation, the electronic device processes the first cropping area based on the second jitter information and the multiple information, to obtain a second cropping area. The cropping the fourth image based on coordinates included in the second cropping area, to obtain a fifth image specifically includes: The internal camera HAL in the electronic device processes the first cropping area based on the second jitter information and the multiple information, to obtain the second cropping area; the internal camera HAL sends the second cropping area to a chip platform camera HAL in the electronic device; and the chip platform camera HAL performs cropping processing on the fourth image based on the coordinates included in the second cropping area, to obtain the fifth image.

With reference to the first aspect, in a possible implementation, after obtaining the fifth image, the electronic device may further perform compression processing on the fifth image, to obtain the close-up image of the first shot object.

With reference to the first aspect, in a possible implementation, after performing stabilization processing on the second image, the electronic device may further obtain a sixth image. The electronic device may perform compression processing on the sixth image, to obtain an image currently displayed in the preview area.

According to a second aspect, this application provides an electronic device. The electronic device includes a camera lens, a display, a memory, and one or more processors. The memory is configured to store a computer program. The display may be configured to display a shooting interface. The shooting interface includes a preview area. The preview area is used to display an image captured by the camera lens. The shooting interface further includes a first image and a first control. The processor may be configured to detect a first operation performed on the first control. The display may further be configured to: in response to the first operation, display one or more markers on the first image. The one or more markers are used to mark a shot object in the first image. The processor may further be configured to detect a second operation performed on the shooting interface. The display may further be configured to: in response to the second operation, display a first window on the preview area of the shooting interface, where the first window displays a close-up image of the first shot object. The first marker is used to mark a first shot object. The shooting interface may further include a recording control. The processor may further be configured to detect a third operation performed on the recording control, and start to record a video. The display may further be configured to in response to the third operation, display a first recording time on the shooting interface, where the first window displays a second recording time.

With reference to the second aspect, in a possible implementation, before detecting a second operation performed on a first marker, the processor may further be configured to: process a RAW image captured by the camera lens to obtain a second image and a third image; perform stabilization processing on the second image, to obtain first jitter information; perform object recognition on the third image according to an object recognition algorithm, to obtain first object recognition information; and process the first object recognition information based on the first jitter information, to obtain second object recognition information. A size of the second image is larger than a size of the third image, and the first jitter information includes a first jitter offset and a first jitter direction. It may be understood that the first object recognition information includes coordinates of one or more shot objects. It may be understood that coordinates of one or more shot objects included in the second object recognition information are used to display the one or more markers on the first image.

With reference to the second aspect, in a possible implementation, after detecting a second operation performed on a first marker, the processor may further be configured to: obtain operation information of the second operation; determine a focus tracking target and coordinates of the focus tracking target based on the operation information of the second operation and the second object recognition information; and determine a first cropping area based on the coordinates of the focus tracking target. It may be understood that the focus tracking target is the first shot object. Coordinates of the first shot object match the operation information of the second operation. The close-up image is an image generated based on the first cropping area.

With reference to the second aspect, in a possible implementation, the processor may further be configured to: process the RAW image captured by the camera lens to obtain a fourth image, and perform stabilization processing on the fourth image, to obtain second jitter information; determine multiple information based on the fourth image and the third image; process the first cropping area based on the second jitter information and the multiple information, to obtain a second cropping area; and cropping the fourth image based on coordinates included in the second cropping area, to obtain a fifth image. The multiple information includes a ratio of the fourth image to the third image. The close-up image is an image generated based on the fifth image. The second jitter information includes a second jitter offset and a second jitter direction.

With reference to the second aspect, in a possible implementation, when processing the first cropping area based on the second jitter information and the multiple information, to obtain a second cropping area, the processor may be specifically configured to: perform, based on the second jitter offset, offset processing on coordinates included in the first cropping area in a direction opposite to the second jitter direction, to obtain a third cropping area; and zoom in the third cropping area based on the multiple information, to obtain the second cropping area.

With reference to the second aspect, in a possible implementation, after obtaining a fifth image, the processor may further be configured to: perform compression processing on the fifth image, to obtain the close-up image of the first shot object.

With reference to the second aspect, in a possible implementation, after performing stabilization processing on the second image, the processor is further configured to obtain a sixth image, the processor may further be configured to: perform compression processing on the sixth image, to obtain an image currently displayed in the preview area.

With reference to the second aspect, in a possible implementation, the electronic device may include a chip platform camera HAL and an internal HAL. The electronic device processes the first cropping area based on the second jitter information and the multiple information, to obtain a second cropping area. The cropping the fourth image based on coordinates included in the second cropping area, to obtain a fifth image specifically includes: The internal camera HAL processes the first cropping area based on the second jitter information and the multiple information, to obtain the second cropping area; the internal camera HAL sends the second cropping area to a chip platform camera HAL in the electronic device; and the chip platform camera HAL performs cropping processing on the fourth image based on the coordinates included in the second cropping area, to obtain the fifth image.

According to a third aspect, this application provides a computer storage medium. The computer storage medium includes computer instructions. When the computer instructions are run on an electronic device, the electronic device is enabled to perform any of the possible implementations in the first aspect described above.

According to a fourth aspect, an embodiment of this application provides a chip. The chip may be used in an electronic device. The chip includes one or more processors. The processor is configured to invoke computer instructions to enable the electronic device to perform any one of the possible implementations in the first aspect.

According to a fifth aspect, an embodiment of this application provides a computer program product including instructions. When the computer program product is run on an electronic device, the electronic device is enabled to perform any of the possible implementations in the first aspect described above.

It may be understood that, the electronic device provided in the second aspect, the computer storage medium provided in the third aspect, the chip provided in the fourth aspect, and the computer program product provided in the fifth aspect are all used to perform any of the possible implementations in the first aspect described above. Therefore, for beneficial effects that can be achieved, reference may be made to the beneficial effect in any one of the possible implementations in the first aspect. The details are not described herein again.

BRIEF DESCRIPTION OF THE DRAWING

FIG. 8A(1) and FIG. 8A(2) is another flowchart of a shooting method according to an embodiment of this application.

DETAILED DESCRIPTION OF EMBODIMENT

Figure 1:
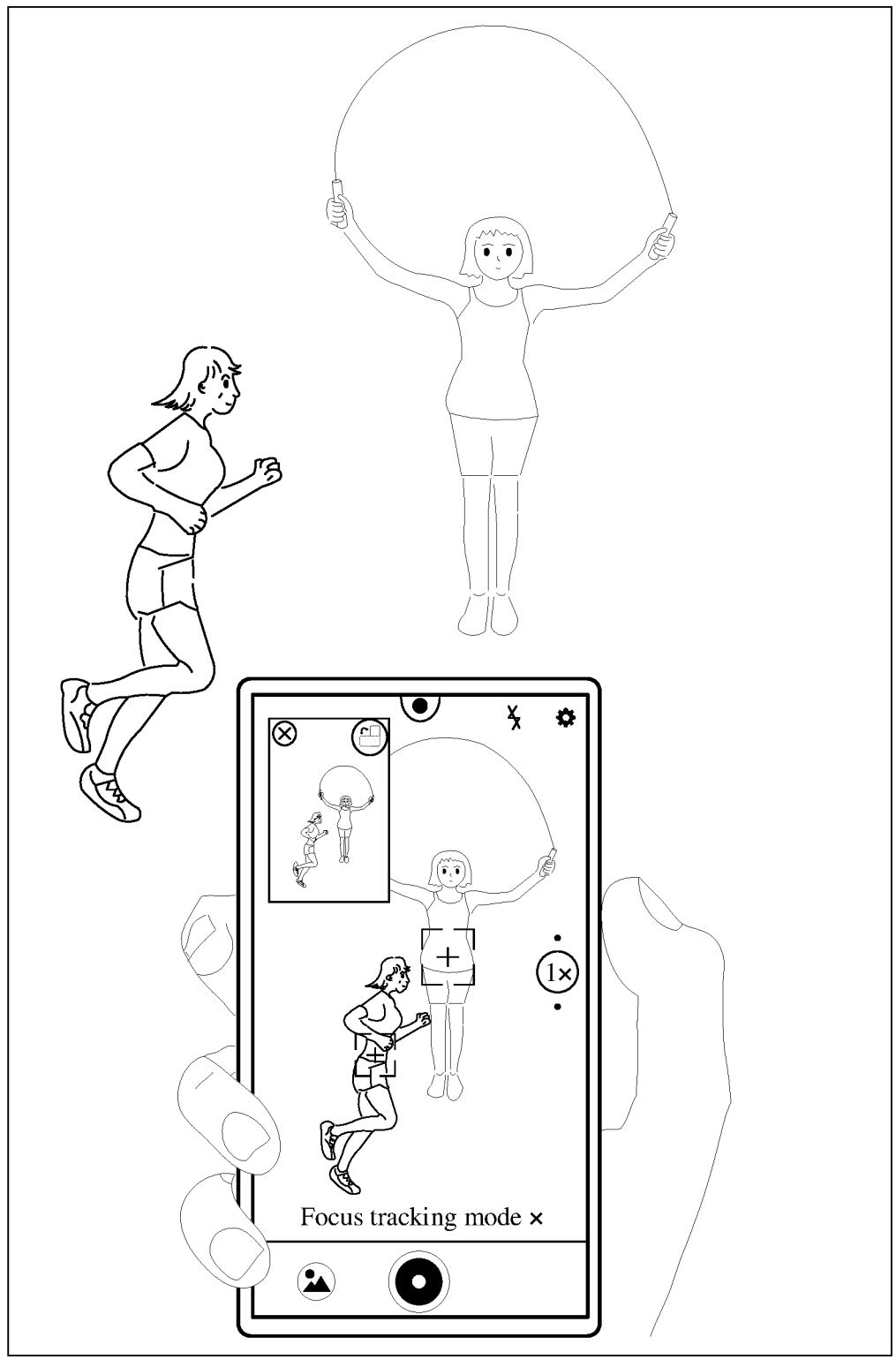
FIG. 1 is a schematic diagram of a shooting scenario according to an embodiment of this application.

The technical solutions in embodiments of this application will be clearly and completely described below with reference to the accompanying drawings in embodiments of this application. In the descriptions of embodiments of this application, unless otherwise stated, "/" represents "or". For example, A/B may represent A or B. In this application, "and/or" merely describes an association relationship between associated objects and represents that three relationships may exist. For example, A and/or B may represent the following three cases: Only A exists, both A and B exist, and only B exists. In addition, in the descriptions of embodiments of this application, "a plurality of" means two or more than two.

It may be understood that, in this specification, claims, and accompanying drawings of this application, terms "first", "second", and the like are intended to distinguish between different objects but do not indicate a particular order. In addition, the terms "include", "have", and any variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this application means that a particular characteristic, structure, or feature described with reference to embodiments may be included in at least one embodiment of this application. The term appearing at various positions in this specification does not necessarily refer to a same embodiment, or an independent or alternative embodiment mutually exclusive with another embodiment. It is explicitly and implicitly understood by a person skilled in the art that embodiments described in this application may be combined with another embodiment.

This application provides a shooting method. The shooting method may be applied to an electronic device with a camera lens. In the shooting method, the electronic device may output a RAW image through the camera lens, and divide the image into three paths of data streams through an image processor. The three paths of data streams are respectively data streams of a panorama path, a focus tracking path, and a detection path respectively. After stabilization processing, the data stream of the panorama path is used to display and preview a large window of a camera application interface. After human body detection and successful focus tracking, information about a human body cropping frame may be output, through the data stream of the detection path, to the focus tracking path for cropping a human body frame. After stabilization processing, smoothing processing, and cropping processing, the data stream of the focus tracking path may be used to display and preview a small window of the camera application interface. It may be understood that related processing on the three data streams is performed in a camera software architecture, and does not depend on a platform. This greatly facilitates transplantation, development, and reuse at another platform at a later stage.

FIG. 1 is a schematic diagram of a shooting scenario according to an embodiment of this application.

As shown in FIG. 1, there is a plurality of persons who are exercising (for example, a person who is running and a person who is jumping rope) in a shooting environment. A user may use an electronic device to perform shooting. In this case, after the user determines a shot object, the shot object may be out of focus in a motion state. In addition, there is interference from another person in the shooting environment. This may cause focus shifting. That is, the focus shifts from the shot object to the another person. The user may open a focus tracking mode and select a shot object. The electronic device may lock the focus on the shot object selected by the user, that is, the problems of out-of-focus and focus shifting do not occur although the shot object moves or there is another task in the shooting scenario.

It may be understood that the shot object is an object to be shot. The shot object involved in this application does not include all persons that may be shot by the electronic device, but a principal photography. In some embodiments of this application, the shot object may also be understood as an object whose focus is locked.

It may be understood that the electronic device may be specifically a mobile phone, a tablet computer, a wearable device, an in-vehicle device, an augmented reality (Augmented Reality, AR) device/a virtual reality (Virtual Reality, VR) device, a notebook computer, an ultra-mobile personal computer (Ultra-Mobile Personal Computer, UMPC), a netbook, a personal digital assistant (Personal Digital Assistant, PDA), a dedicated camera (for example, a digital single lens reflex or a cube camera), among other electronic devices. A specific type of the electronic device is not limited in embodiments of this application.

A shooting scenario provided in this application is described below in detail with reference to schematic diagrams of a group of user interfaces.

It may be understood that the terms "interface" and "user interface" in this specification, claims, and accompanying drawings of this application are medium interfaces that are used for interaction and information exchange between an application or an operating system and a user, and implement conversion between an internal form of information and a form that can be accepted by the user. The user interface is usually represented in a form of a graphical user interface (graphic user interface, GUI), which is a user interface displayed in a graphical mode and related to computer operations. The graphical user interface may be an interface element such as an icon, a window, or a control that is displayed on a display of an electronic device. The control may include visible interface elements such as an icon, a button, a menu, a tab, a text box, a dialog box, a status bar, a navigation bar, and a Widget.

1. Entering a Focus Tracking Mode (FIG. 2A to FIG. 2D)

Figure 2A:
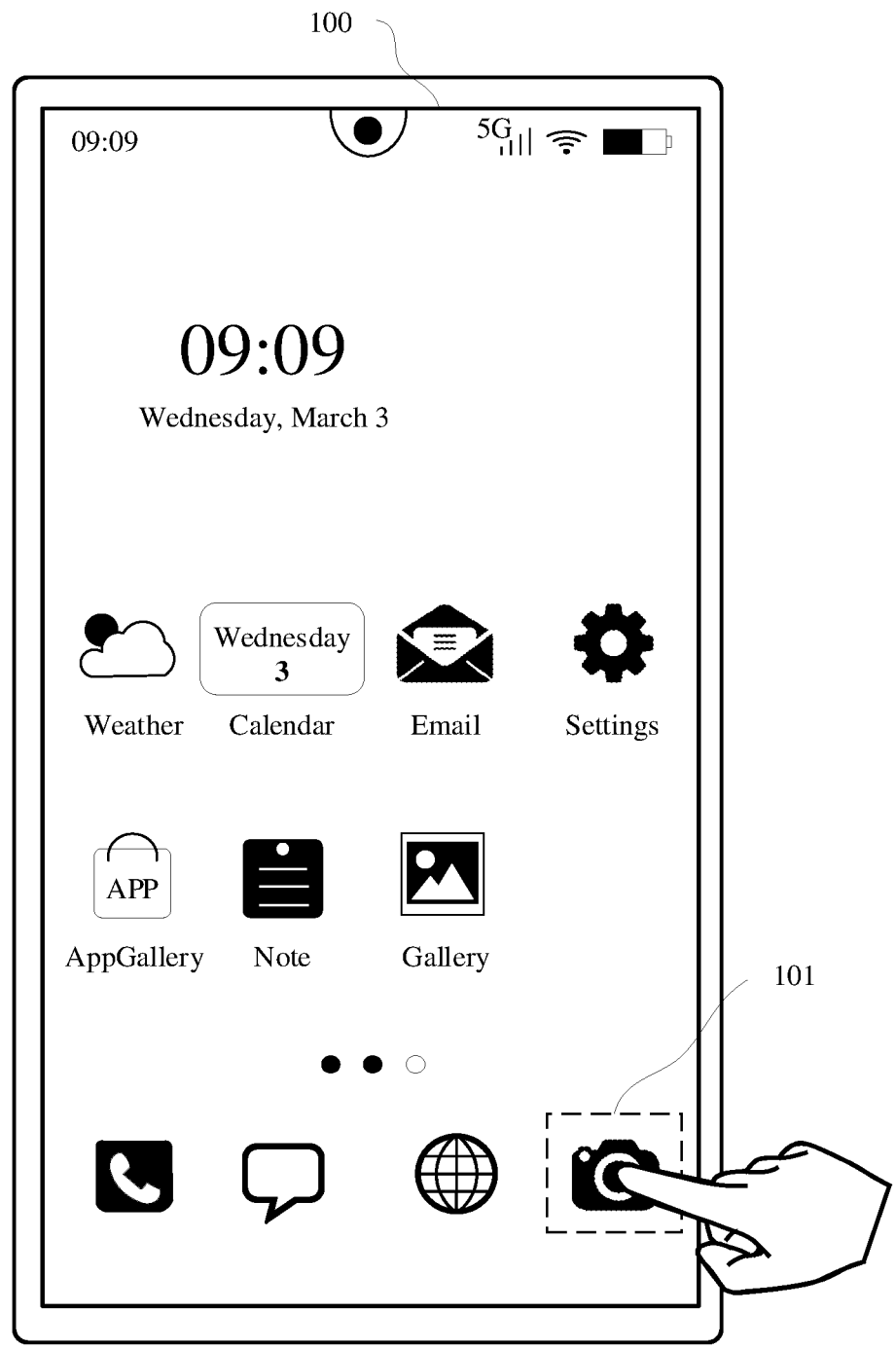
FIG. 2A to FIG. 2V are schematic diagrams of a group of user interfaces according to an embodiment of this application.

As shown in FIG. 2A, the user interface 100 displays a page with application icons. The page may include a plurality of application icons (for example, a weather application icon, a calendar application icon, a gallery application icon, a notes application icon, an email application icon, an AppGallery icon, a settings application icon, and the like). Page indicators may also be displayed below the plurality of application icons, to indicate a positional relationship between a currently displayed page and other pages. There are a plurality of application icons (for example, a camera application icon 101, a browser application icon, an information application icon, and a phone application icon) below the page indicators. The application icon remains displayed during page switching.

It may be understood that the camera application icon 101 is an icon of a camera application. The camera application icon 101 may be configured to trigger to start a camera application. The camera application is an image shooting application on an electronic device such as a smartphone or a tablet computer. A name of the application is not limited in this application.

The electronic device may detect a user operation performed on the camera application icon 101. In response to the operation, the electronic device may display a user interface 200 shown in FIG. 2B. The user interface 200 may be a shooting interface of a default photo shooting mode of the camera application. The user may preview an image on the interface and complete photo shooting. In other words, the user may open the user interface 200 of the camera application by tapping the camera application icon 101.

It may be understood that the user operation in this application may include, but not limited to, a touch (for example, a tap), voice control, a gesture, or the like. This is not limited in this application.

Figure 2B:
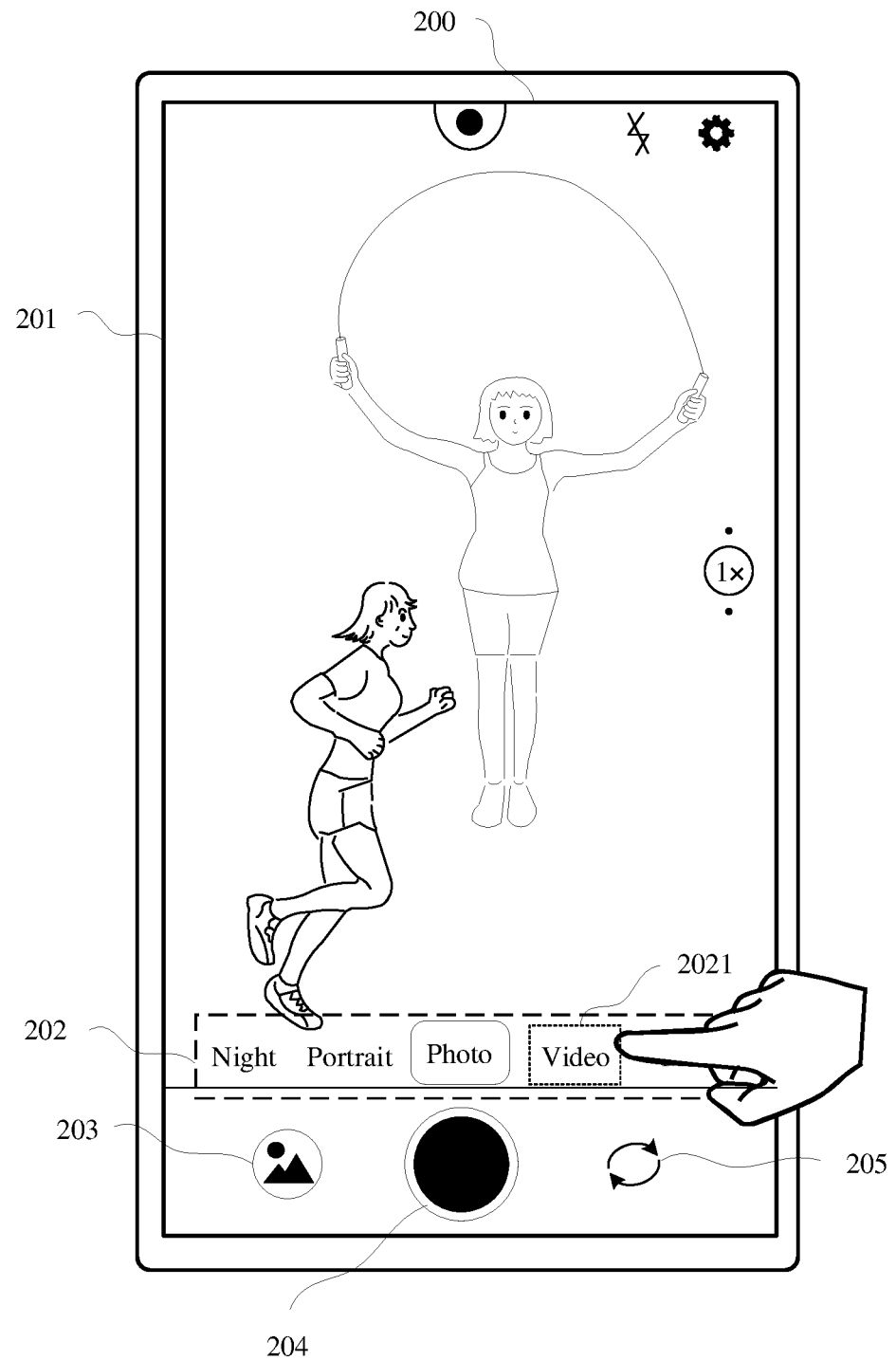
Figure 2C:
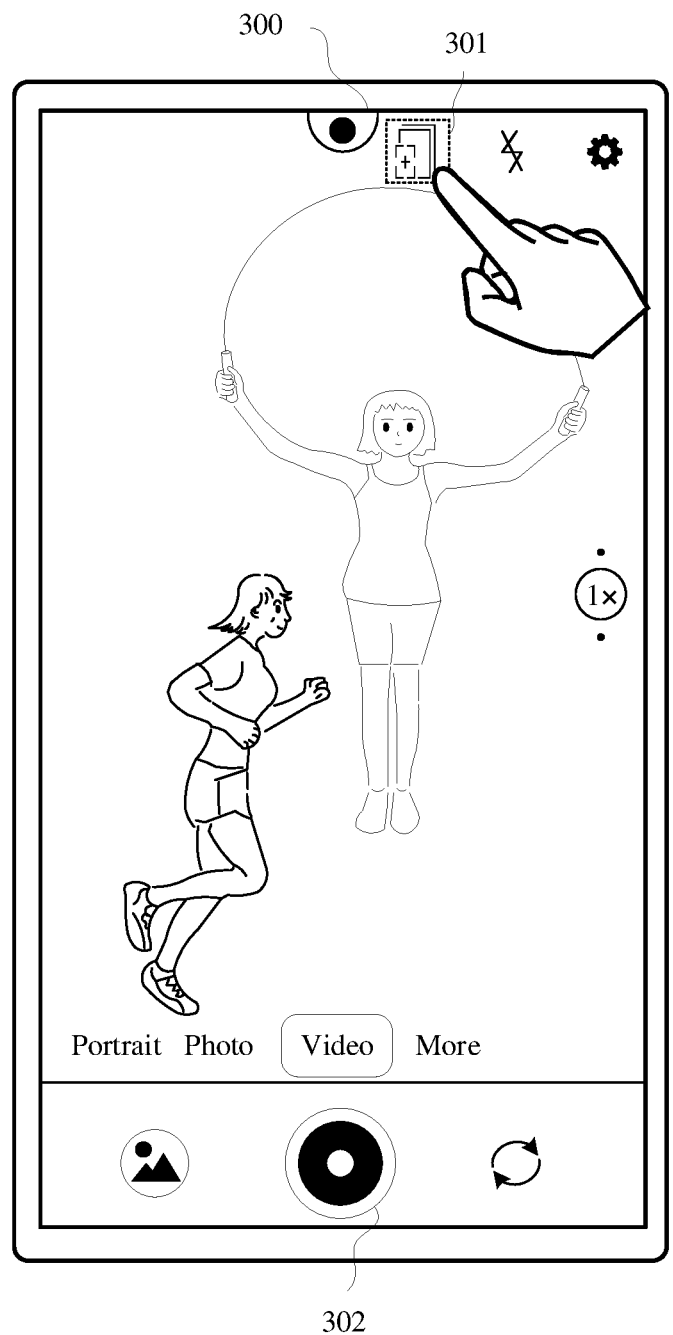

As shown in FIG. 2B, the user interface 200 may include a preview area 201, a camera mode option 202, a gallery shortcut control 203, a shutter control 204, and a camera lens flipping control 205.

The preview area 201 may be configured to display a preview image. The preview image is an image captured in real time by the electronic device with a camera lens.

One or more shooting mode options may be displayed in the camera mode option 202. The one or more shooting mode options may include a night mode option, a smart portrait mode option, a photo shooting mode option, a video recording mode option 2021, and the like. It may be understood that more or fewer shooting mode options may further be included in the camera mode option 202.

The gallery shortcut control 203 may be configured to open a gallery application. The user may view a shot image and a recorded video after triggering the electronic device to open the gallery application by using the gallery shortcut control 203.

The shutter control 204 may be used for monitoring an operation performed by the user to trigger photo shooting. In addition, the electronic device may also display a thumbnail of the saved image or video in the gallery shortcut control 203.

The camera lens flipping control 205 may be used for monitoring an operation performed by the user to trigger flipping of a camera lens.

The electronic device may detect a user operation performed on the video recording mode option 2021. In response to the user operation, the electronic device may display a user interface 300 shown in FIG. 2C. The user interface 300 is a video recording preview interface of the camera application.

The controls included in the user interface 300 are basically the same as those included in the user interface 200, with the difference that the user interface 300 may include a focus tracking mode control 301 and a video recording start control 302. The focus tracking mode control 301 may be used to trigger the electronic device to enter the focus tracking mode. The video recording start control 302 is used to trigger the electronic device to record a video.

The electronic device may detect a user operation performed on the focus tracking mode control 301. In response to the user operation, the electronic device may display a user interface 400 shown in FIG. 2D. The user interface 400 is a video recording preview interface after the focus tracking mode is opened and focus tracking is not started.

Figure 2D:
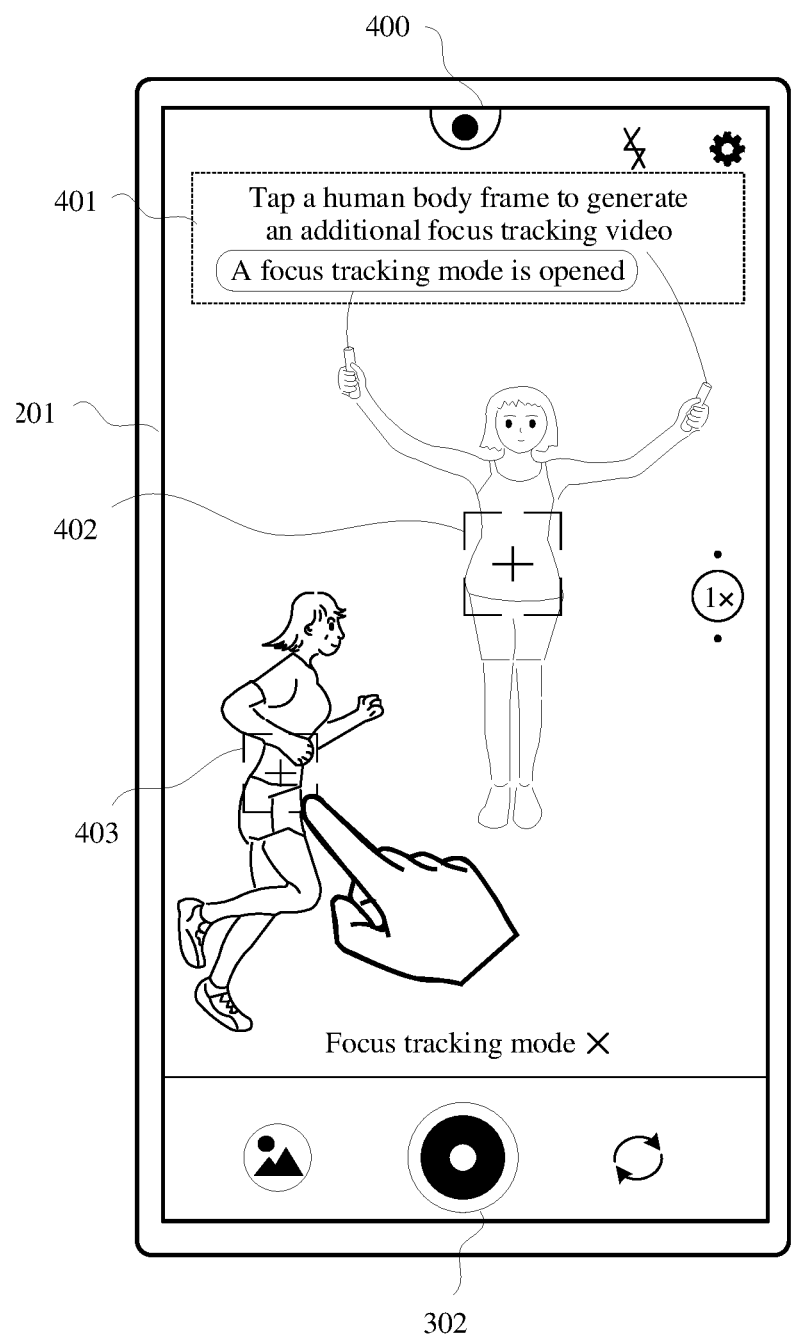

The user interface 400 may include a display area 401, a preview area 201, a human body frame 402, and a human body frame 403. The display area 401 may include prompt information that the focus tracking mode is opened, and prompt information about an operation of recording a focus tracking video. As shown in FIG. 2D, the display area 401 displays "Tap the human body frame to additionally generate a focus tracking video" and "The focus tracking mode is opened". As shown in FIG. 2D, the preview area 201 displays two persons who are exercising. The preview area 201 may include the human body frame 402 and the human body frame 403.

The human body frame 402 is used to frame the person who is jumping rope. The human body frame 403 is used to frame the person who is running.

Figure 2E:
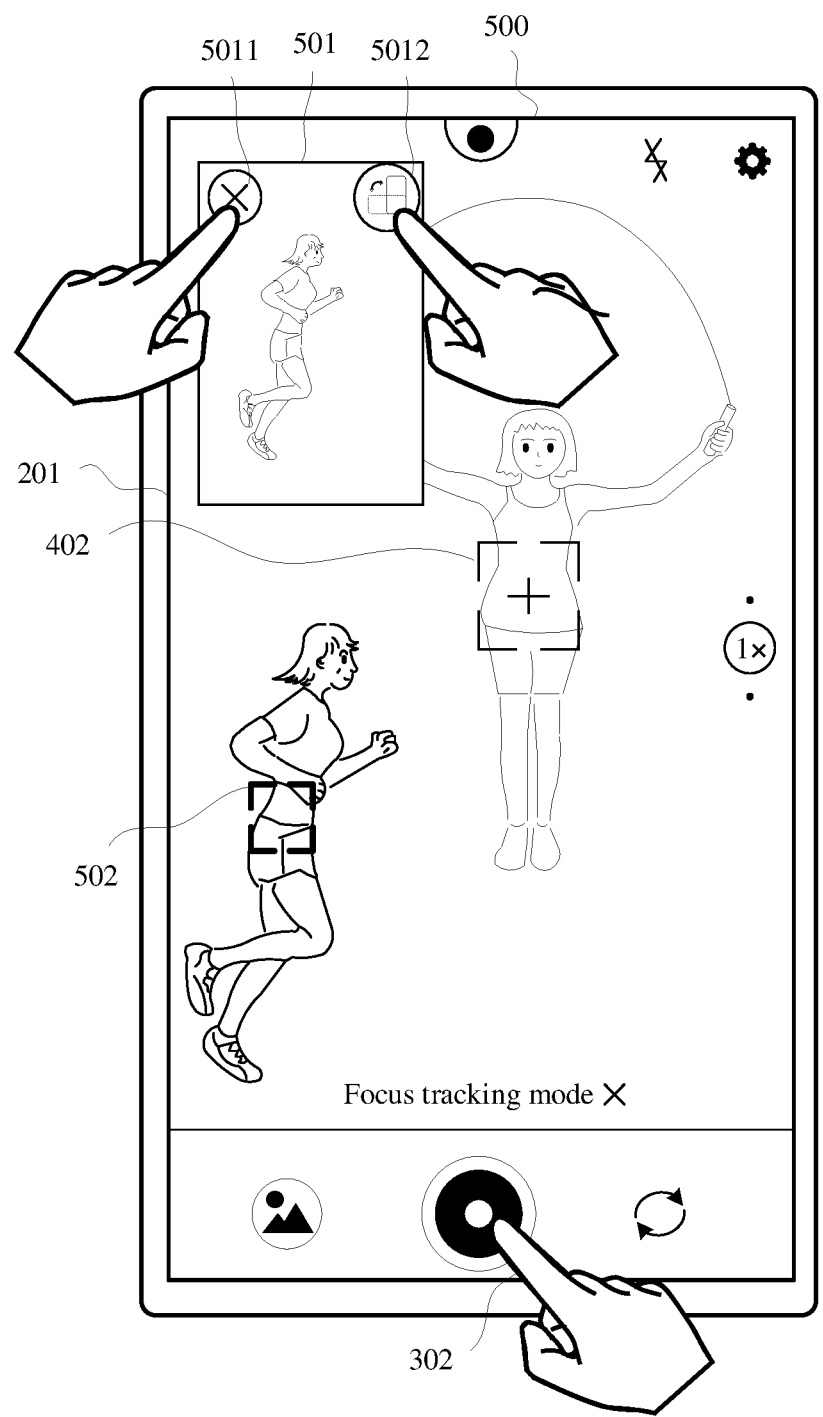
Figure 2F:
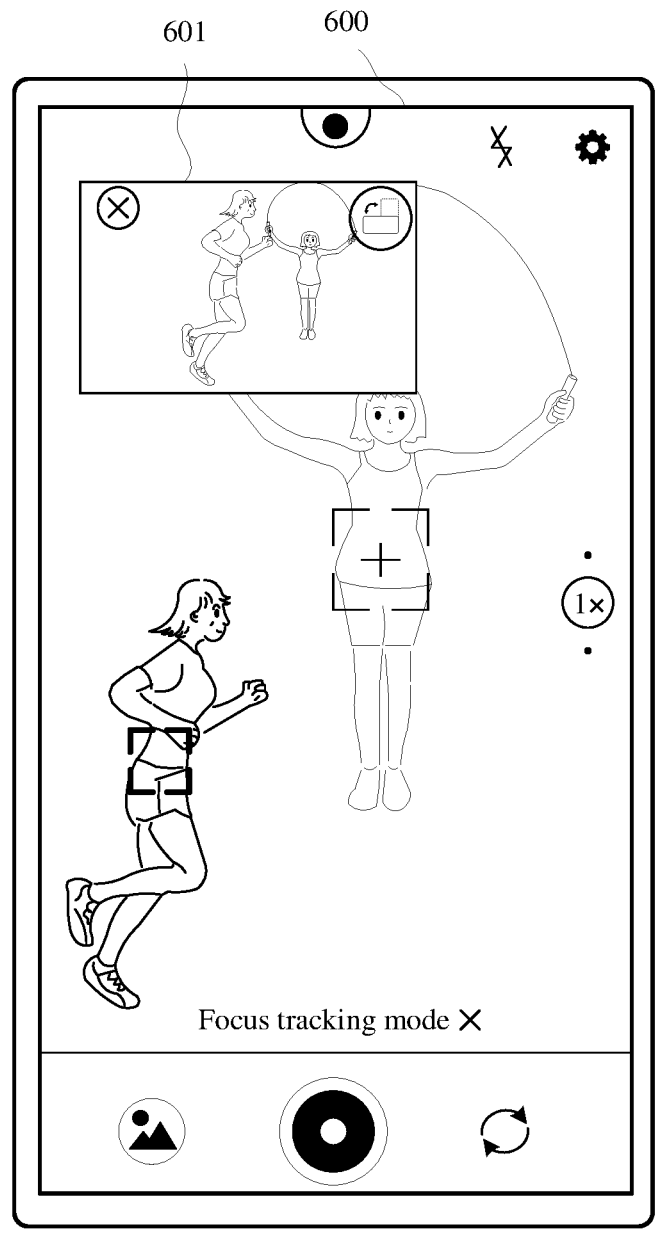

2. Selecting a Focus Tracking Target During Preview (FIG. 2E to FIG. 2F)

The electronic device may detect a user operation performed on the human body frame 402. In response to the user operation, the electronic device may display a user interface 500 shown in FIG. 2E. The user interface 500 is a video recording preview interface after the focus tracking mode is opened, focus tracking is started, and focus tracking succeeds.

It may be understood that after detecting the user operation performed on the human body frame 402, the electronic device may determine that the focus tracking target is the person who is running. After focus tracking succeeds, the electronic device may lock the focus on the person who is running.

The user interface 500 may include a display area 501 and a focus tracking human body frame 502. Certainly, the user interface 300 is the same as the user interface 400. The user interface may further include a preview area 201 and a video recording start control 302.

The display area 501 is used to display a close-up picture of the focus tracking target, that is, a close-up image of the focus tracking target. In comparison with an image displayed in the preview area 201, main content of an image displayed in the display area 501 is the focus tracking target. The display area 501 may include a control 5011 and a control 5012. The control 5011 is used to cancel the focus tracking. The control 5012 is used to adjust a size of the display area 501. The focus tracking human body frame 502 may be used to frame the focus tracking target.

It may be understood that the electronic device may detect the user operation performed on the control 5012. In response to the user operation, the electronic device may display a user interface 600 shown in FIG. 2F. Controls included in the user interface 600 are basically the same as the controls included in the user interface 500, with the difference that sizes of the display area 601 in the user interface 600 and the display area 501 in the user interface 500 are different.

It should be noted that after focus tracking is started and focus tracking succeeds, a default size of a small window of the close-up image of the focus tracking target displayed by the electronic device may be set as required. For example, the default size may be a size of the display area 601 or a size of the display area 501. This is not limited in this application.

Certainly, the user interface 500 may further include a human body frame for framing a person who is not selected as the focus tracking target, for example, the human body frame 402.

3. Losing the Focus Tracking Target During Preview, and Exiting Focus Tracking (FIG. 2G to FIG. 2H)

In some embodiments of this application, when the electronic device is in a video recording preview state in the focus tracking mode, because the focus tracking target is far away from the electronic device or is beyond a viewfinder range of the electronic device, the electronic device may lose the focus tracking target, that is, may not detect the focus tracking target. It may be understood that the viewfinder range of the electronic device is related to a field of view and a focal length.

Figure 2G:
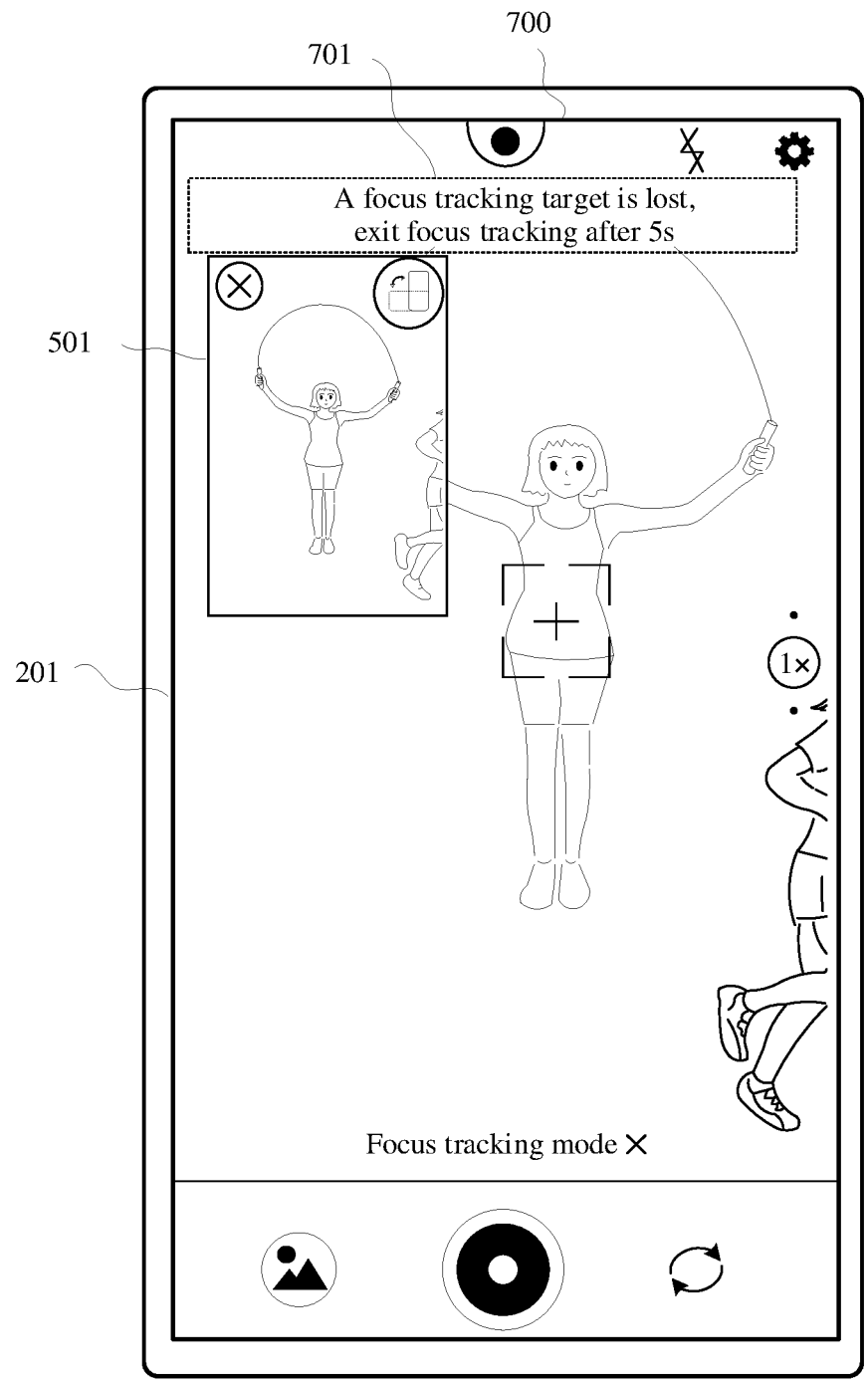
Figure 2H:
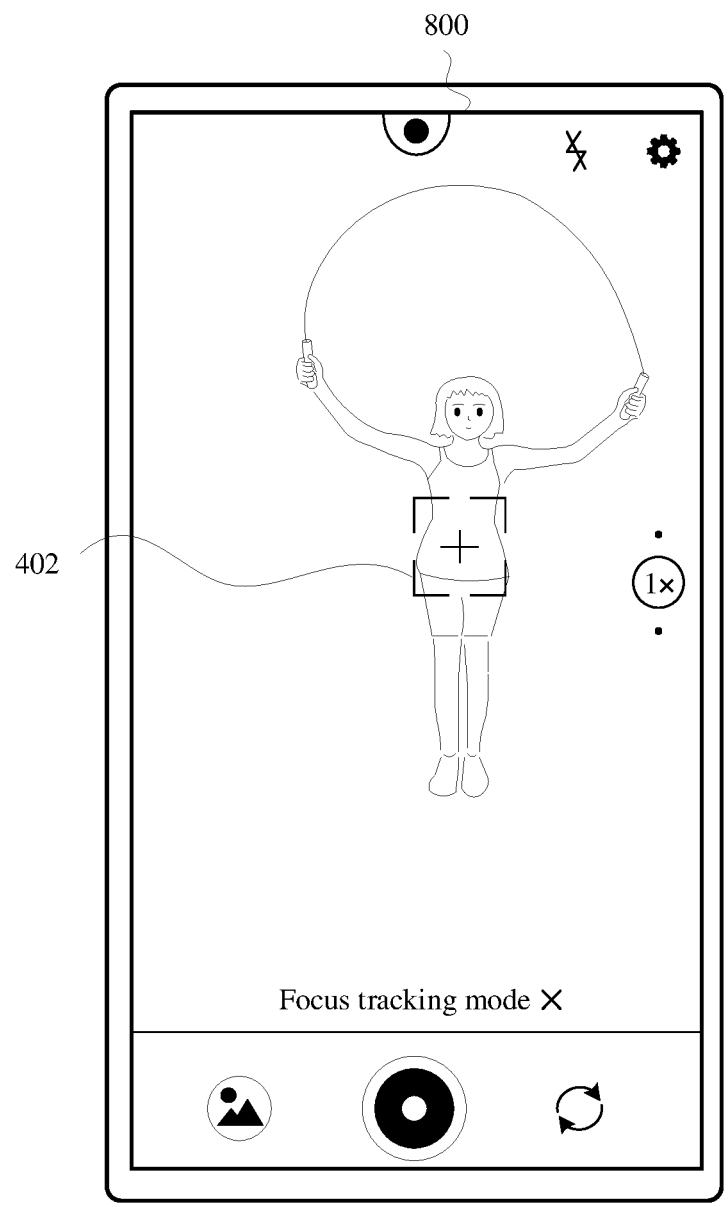

As shown in FIG. 2G, the electronic device may display a user interface 700. The user interface 700 includes a display area 701, a display area 501, and a preview area 201. Based on the image displayed in the preview area 201, the person who is running is about to be completely out of the viewfinder range of the electronic device. In this case, the electronic device does not detect the focus tracking target, and is in an out-of-focus state (that is, a state that the focus tracking target is lost). In this case, the display area 501 and the preview area 201 display a same image. The display area 701 may be used to display prompt information about out-of-focus and exiting of focus tracking. As shown in FIG. 2G, the display area may display "The focus tracking target is lost, exit focus tracking after 5 s".

It may be understood that, after the focus tracking target is lost, |the electronic device automatically exits focus tracking after 5 s. As shown in FIG. 2H, the electronic device may display a user interface 800. The user interface 800 may include the human body frame 402. In some embodiments, after automatically exiting focus tracking, the electronic device may display a user interface that displays a plurality of human body frames. The user may select the focus tracking target again, or, wait for an original focus tracking target to re-enter the viewfinder range of the electronic device.

In some embodiments of this application, if the electronic device is out of focus for no more than 5 s, the focus tracking target is not retrieved, and the user does not switch the focus tracking target, the display area 501 may continue to display a last frame of the image that is displayed in the display area 501 before the electronic device is out of focus.

It may be understood that an interval from a time point at which the electronic device is out-of-focus to a time point at which the electronic device exits focus tracking may be another value, for example, 2 s, 3 s, 6 s, and the like. The interval may be set based on an actual requirement. This is not limited in this application.

4. Recording, Pausing, Saving, and Viewing a Video in the Focus Tracking Mode (FIG. 2I to FIG. 2M)

The electronic device may detect the user operation performed on the video recording start control 302 included in the user interface 500 as shown in FIG. 2E. In response to the user operation, the electronic device may start to record a video.

Figure 2I:
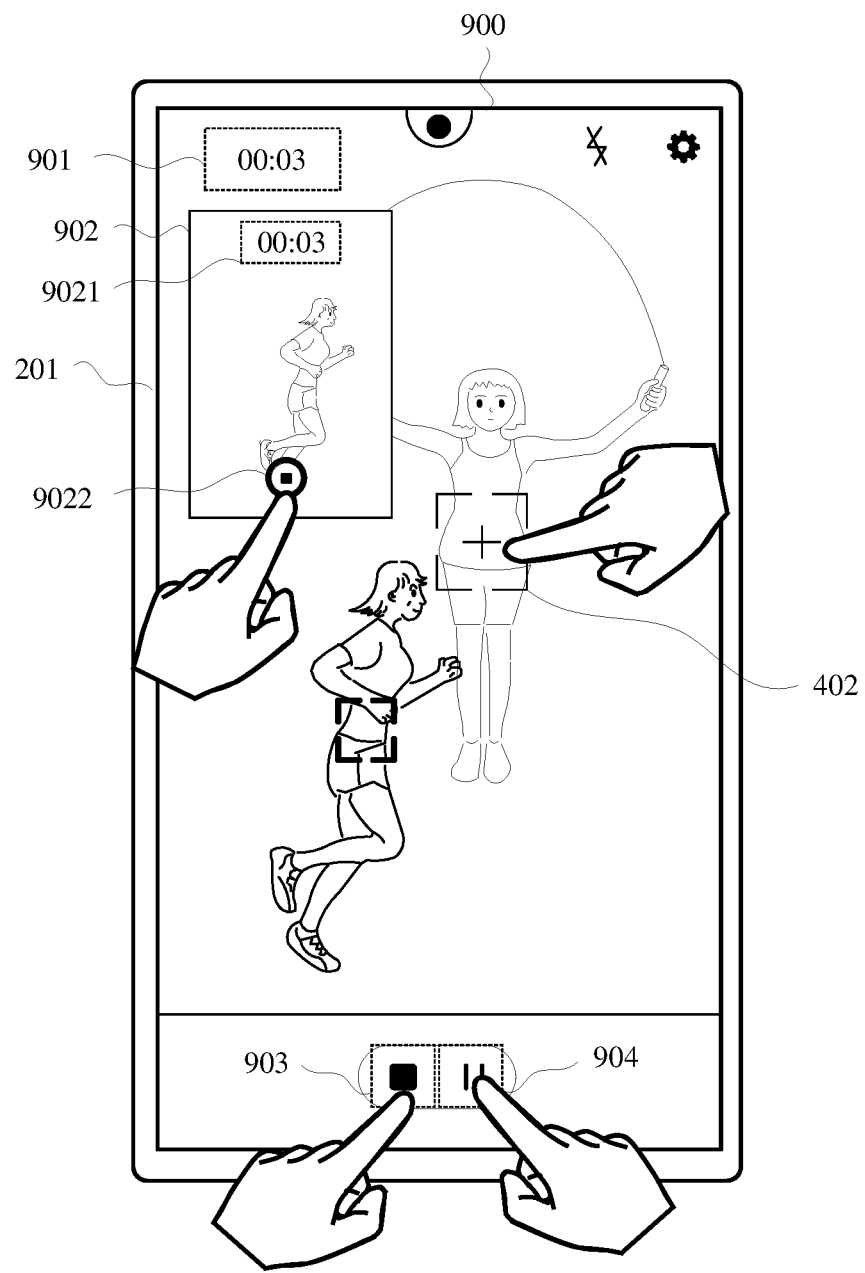

As shown in FIG. 2I, the electronic device may display a user interface 900. The user interface 900 may include a display area 901, a display area 902, a video recording end control 903, and a video recording pause control 904.

The display area 901 is used to display a recording time of a video corresponding to the preview area 201. As shown in FIG. 2I, the recording time of the video corresponding to the preview area 201 is "00:03", that is, 3 s. The display area 902 is used to display the close-up picture of the focus tracking target. The display area 902 may include a display area 9021 and a video recording end control 9022. The display area 9021 is used to display a recording time of a video corresponding to the display area 902. The video recording end control may be used to stop recording the video corresponding to the display area 902. It may be understood that the video corresponding to the display area 902 is a focus tracking video, that is, a video with the focus tracking target as a subject. The video recording end control 903 is used to stop recording the video corresponding to the preview area 201. The video recording pause control 904 is used to pause recording the video corresponding to the preview area 201.

In some embodiments of this application, after pausing recording of the video corresponding to the preview area 201, the electronic device pauses recording the video corresponding to the display area 902. Accordingly, once continuing to record the video corresponding to the preview area 201, the electronic device continues to record the video corresponding to the display area 902.

Figure 2J:
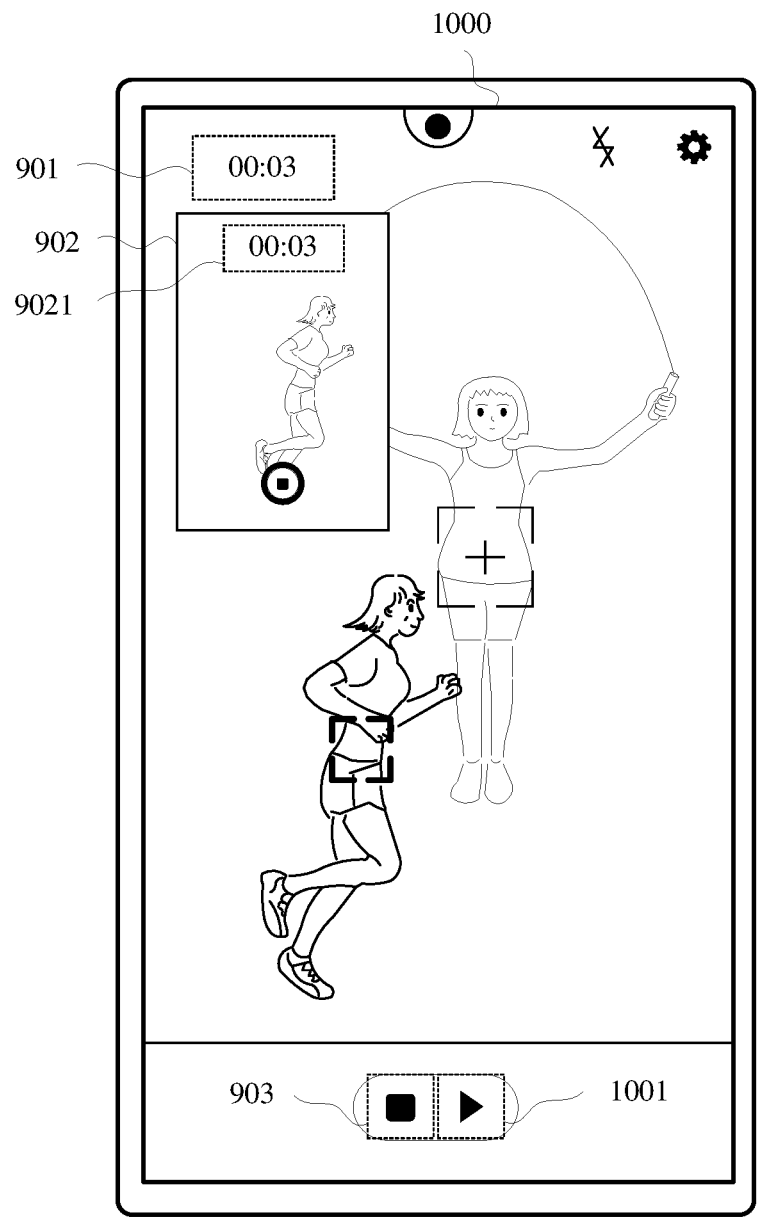
Figure 2K:
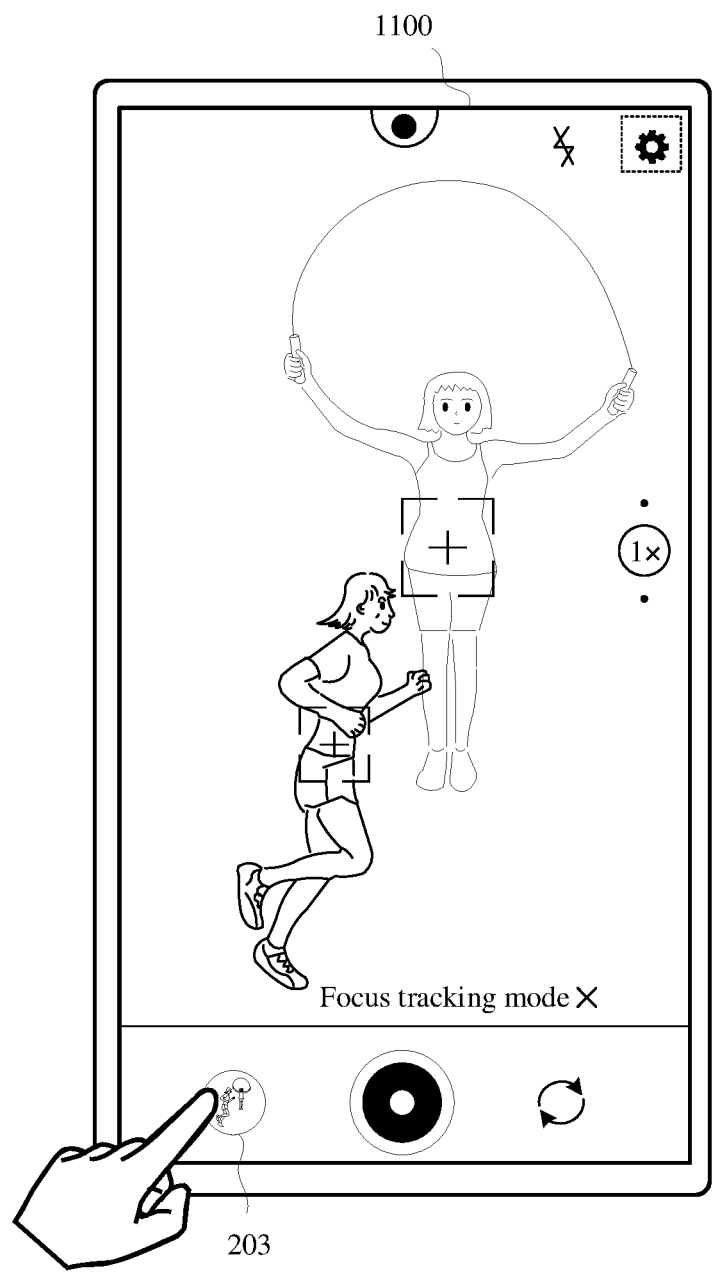
Figure 2L:
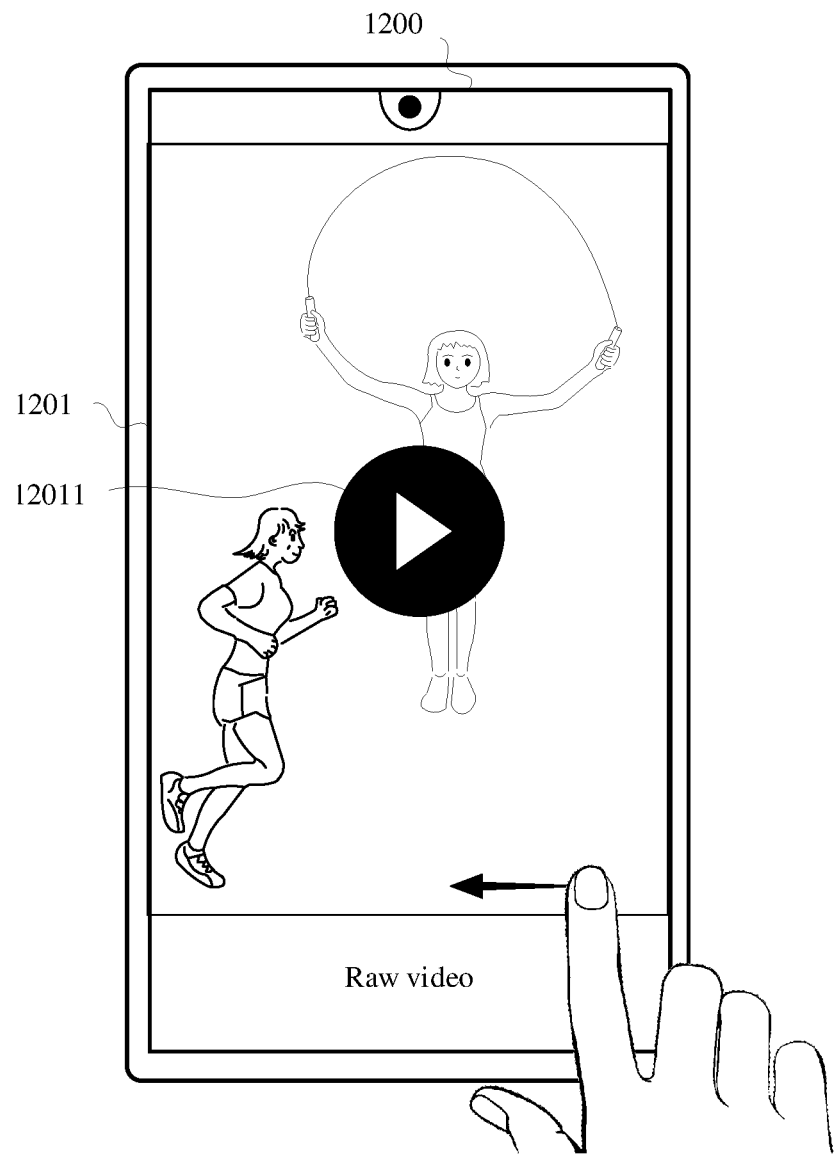
Figure 2M:
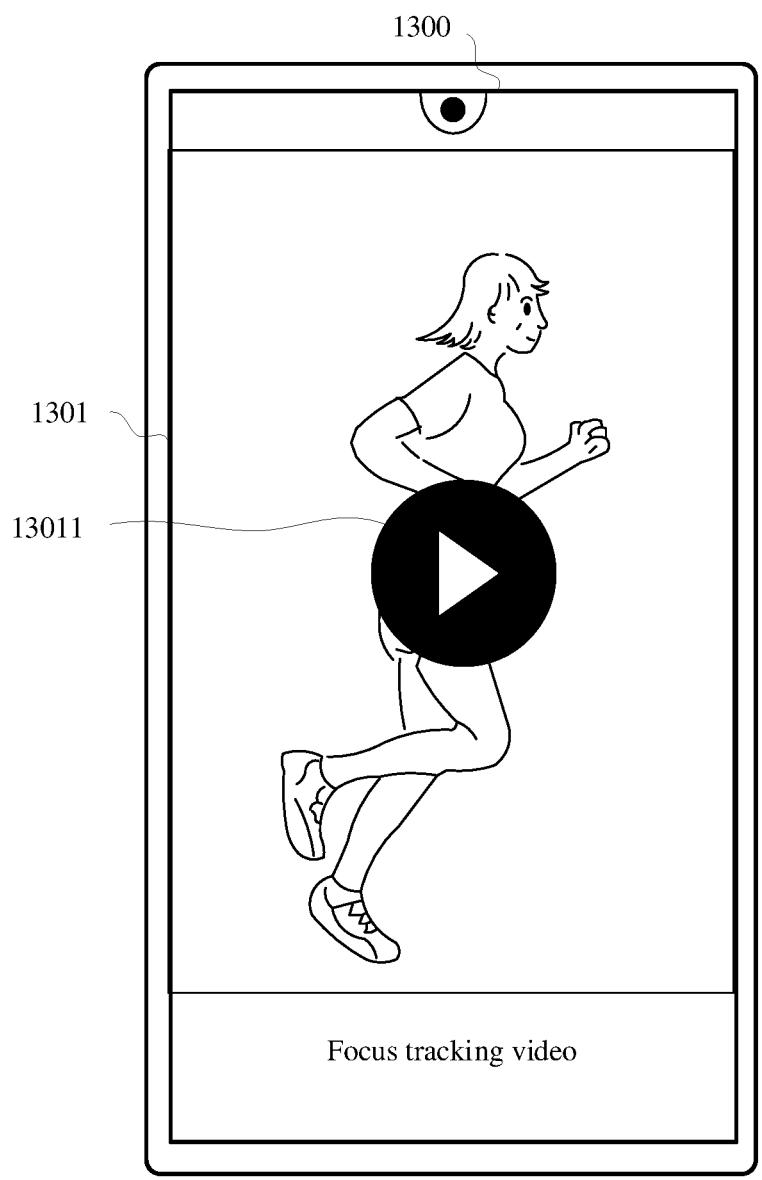

For example, the electronic device may detect a user operation performed on the video recording pause control 904. In response to the user operation, the electronic device may display a user interface 1000 as shown in FIG. 2J. Controls included in the user interface 1000 are basically the same as those included in the user interface 900, with the difference that the user interface 1000 may include a video recording continuing control 1001. The video recording continuing control 1001 is used to continue to record the video corresponding to the preview area 201. As shown in FIG. 2J, the recording time of the video corresponding to the display area 901 and a recording time of the video corresponding to the display area 9021 included in the user interface 1000 stay at "00:03". This means that the videos corresponding to both the preview area 201 and the display area 902 are paused.

In some embodiments of this application, after pausing recording of the video corresponding to the preview area 201, the electronic device does not pause recording the video corresponding to the display area 902.

In some embodiments of this application, the display area 902 may further include a video recording pause control. The video recording pause control may be used to pause recording the video corresponding to the display area 902. In this case, once the electronic device detects the user operation performed on the video recording pause control included in the display area 902, in response to the user operation, the electronic device may pause recording the video corresponding to the display area 902. The electronic device may continue to record the video corresponding to the preview area 201.

In some embodiments of this application, after stopping recording of the video corresponding to the preview area 201, the electronic device also stops recording the video corresponding to the display area 902.

The electronic device may detect a user operation performed on the video recording end control 903. In response to the user operation, the electronic device may display a user interface 1100 shown in FIG. 2K. Controls included in the user interface 1100 are basically the same as the controls included in the user interface 400. A gallery shortcut control 203 included in the user interface 1100 may display a thumbnail of a first frame of the image of the video corresponding to the preview area 201 saved by the electronic device.

For ease of description, in this application, a video constituted by the image displayed in the preview area 201 (the video corresponding to the preview area 201) is denoted as a raw video, and a video constituted by the image displayed in the display area 902 (the video corresponding to the display area 902) is denoted as a focus tracking video. Based on the foregoing description, after stopping recording of the video, the electronic device may save the raw video and the focus tracking video.

The electronic device may detect a gallery shortcut control 203 performed on the user interface 1100. In response to the user operation, the electronic device may display a user interface 1200 shown in FIG. 2L. The user interface 1200 may include a display area 1201. The display area 1201 includes a control 12011. The electronic device may detect a user operation performed on the control 12011. In response to the user operation, the electronic device may display a raw video in the display area 1201.

The electronic device may detect a swipe left operation performed on the user interface 1200. In response to the user operation, the electronic device may display a user interface 1300 shown in FIG. 2M. Similar to the user interface 1200, the user interface 1300 may include a display area 1301. The display area 1301 may include a control 13011. The electronic device may detect a user operation performed on the control 13011. In response to the user operation, the electronic device may display the focus tracking video in the display area 1301.

In some embodiments of this application, after stopping recording of the video corresponding to the display area 902, the electronic device does not stop recording the video corresponding to the preview area 201. In this case, once the electronic device detects the user operation performed on the video recording end control 9022, in response to the user operation, the electronic device may stop recording the video corresponding to the display area 902.

Figure 2N:
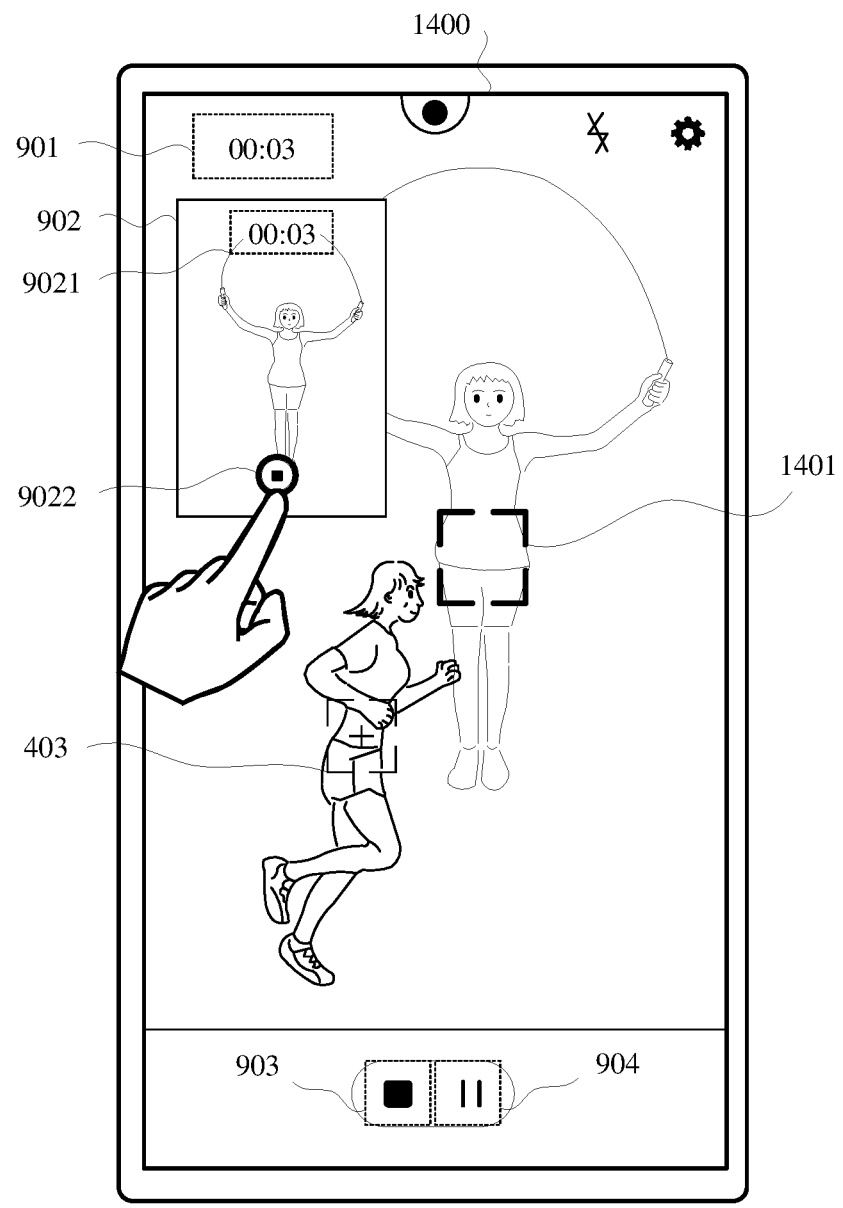
Figure 2O:
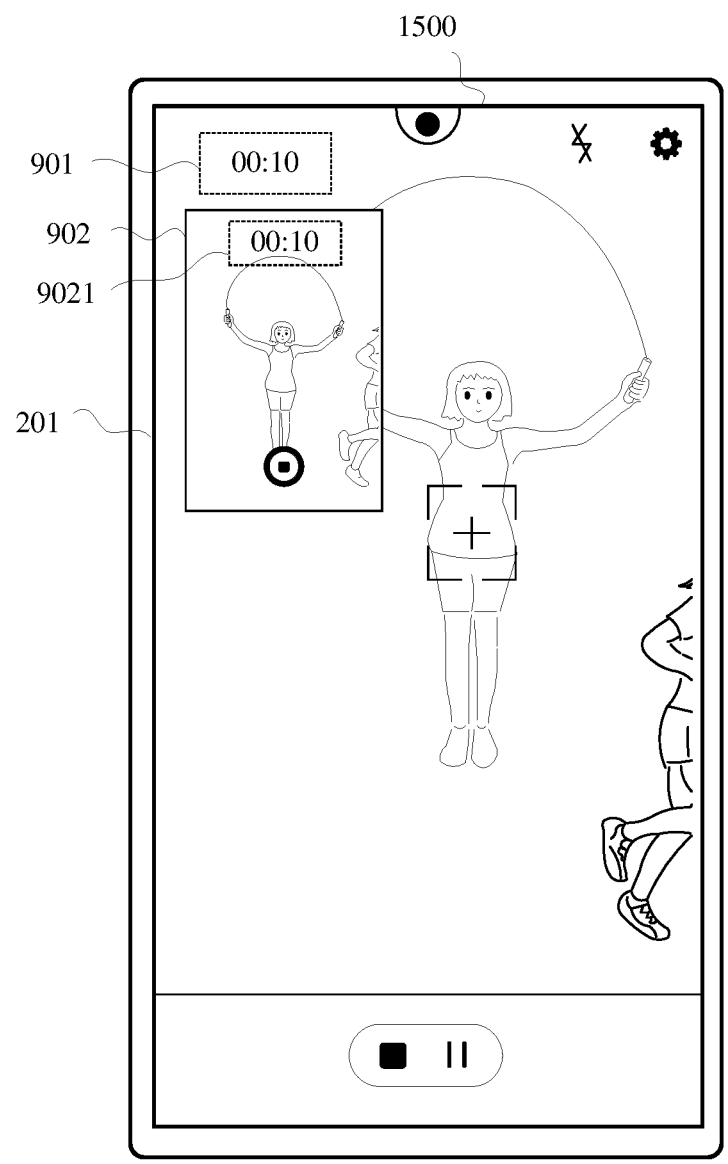
Figure 2P:
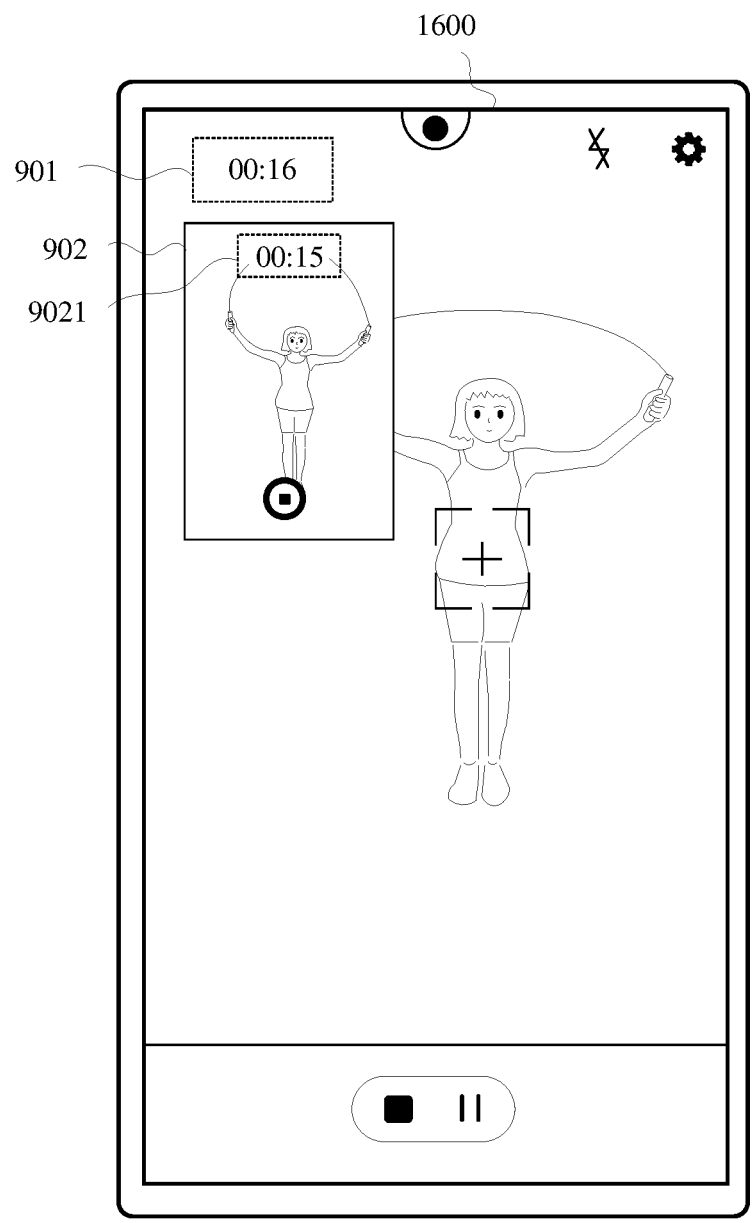
Figure 2Q:
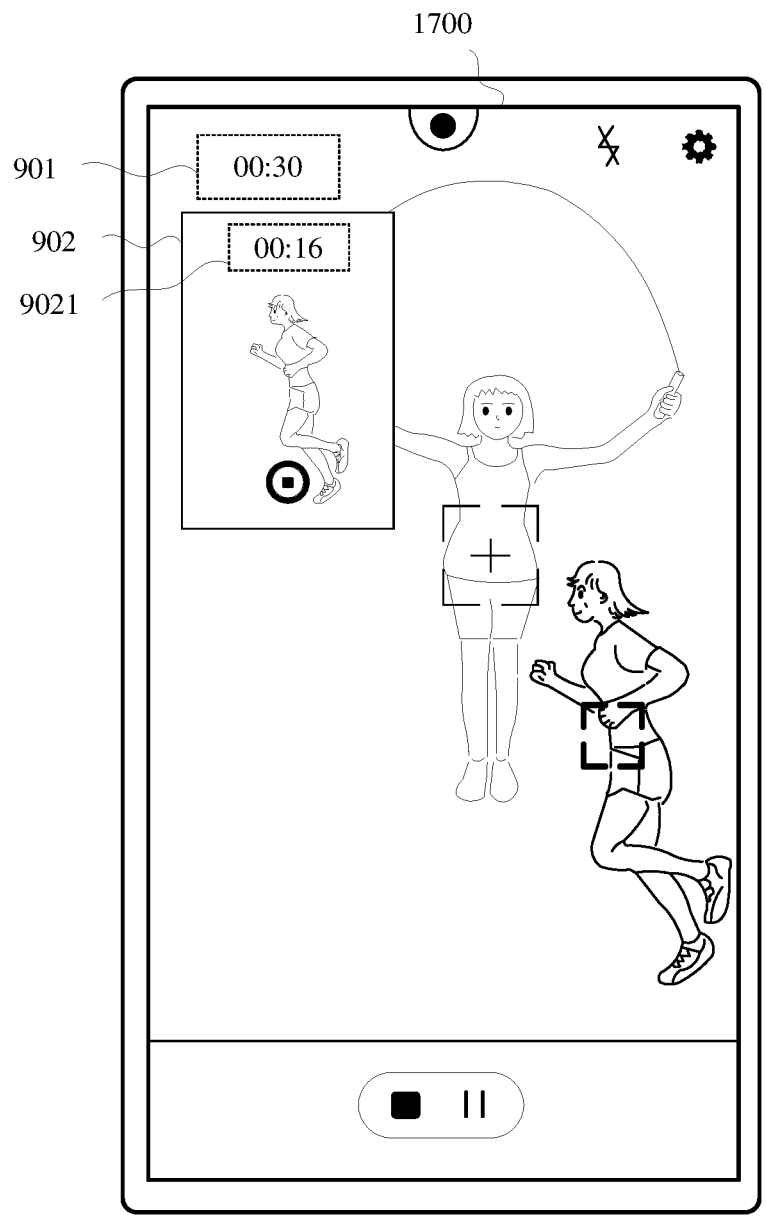

5. Switching the Focus Tracking Target, Losing the Focus Tracking Target, and Retrieving the Focus Tracking Target During Recording of Focus Tracking (FIG. 2O to FIG. 2Q)

The electronic device may detect a user operation performed on the human body frame 402 included in the user interface 900 as shown in FIG. 2I. In response to the user operation, the electronic device may display a user interface 1400 as shown in FIG. 2N. The user interface 1400 may include a focus tracking human body frame 1401, a human body frame 403, and a display area 902. The focus tracking human body frame 1401 is used to frame the focus tracking target selected by the user, that is, the person who is jumping rope. The human body frame 403 is used to frame another person within the viewfinder range of the electronic device, that is, the person who is running. The display area 902 is used to display the close-up picture of the focus tracking target. As shown in FIG. 2I, the display area 902 may display a close-up picture of the focus tracking target (that is, the person who is jumping rope) after switching.

Similar to losing the focus tracking target during preview, in some embodiments of this application, when the electronic device is in a video recording state in the focus tracking mode, because the focus tracking target is far away from the electronic device or is beyond the viewfinder range of the electronic device, the electronic device may lose the focus tracking target, that is, may not detect the focus tracking target.

In some embodiments of this application, within a period of time (for example, 5 s) after out-of-focus, the electronic device continues to record the video corresponding to the preview area 201 and the video corresponding to the display area 902. Within the period of time, the display area 902 and the preview area 201 display a same image. After the period of time, if the focus tracking target is still not retrieved and the user does not switch the focus tracking target, the electronic device may continue to record the video corresponding to the preview area 201 and pause to record the video corresponding to the display area 902.

As shown in FIG. 2O, the electronic device may display a user interface 1500. Controls included in the user interface 1500 are basically the same as the controls included in the user interface 1400. Based on the image displayed in the preview area 201, the person who is running is about to be completely out of the viewfinder range of the electronic device. In this case, the electronic device does not detect the focus tracking target and is in an out-of-focus state (that is, a state that the focus tracking target is lost). In this case, the display area 902 and the preview area 201 display a same image. A recording time of the video corresponding to the display area 901 included in the user interface 1500 stays at "00:10", and a recording time of the video corresponding to the display area 9021 in the display area 902 included in the user interface 1500 stays at "00:10". In other words, after out-of-focus, recording of the video corresponding to the display area 902 and the video corresponding to the preview area 201 is continued until a $10^{th}$ second.

As shown in FIG. 2P, the electronic device may display a user interface 1600. A recording time of the video corresponding to the display area 901 included in the user interface 1600 stays at "00:16", and a recording time of the video corresponding to the display area 9021 in the display area 902 included in the user interface 1500 stays at "00:15". In other words, after out-of-focus for more than 5 s, the recording of the video corresponding to the display area 902 is paused, and recording of the video corresponding to the preview area 201 is continued. In addition, the display area 902 continues to display the last frame of the image displayed before the recording is paused. In some embodiments of this application, after the electronic device loses the focus tracking target for a period of time (for example, 5 s), the display area 902 is masked. Generally speaking, after the focus is lost, the display area 902 is grayed.

In some embodiments of this application, the electronic device may display the prompt information about out-of-focus and exiting of focus tracking. Details may be referred to the display area 701 shown in FIG. 2G and not be described herein.

In some embodiments of this application, within a period of time (for example, 5 s) after out-of-focus, the electronic device continues to record the video corresponding to the preview area 201 and the video corresponding to the display area 902. Within the period of time, the display area 902 continues to display the last frame of the image displayed before out-of-focus. After the period of time, if the focus tracking target is still not retrieved and the user does not switch the focus tracking target, the electronic device may continue to record the video corresponding to the preview area 201 and pause to record the video corresponding to the display area 902.

It may be understood that, in the recording process, an interval from a time point at which the electronic device is out-of-focus to a time point at which the electronic device pauses recording the video corresponding to the display area 902 may be set based on an actual requirement. This is not limited in this application.

In some embodiments of this application, if the electronic device is out of focus for more than 5 s and does not retrieve the focus tracking target, and the user does not switch the focus tracking target, once re-detecting the focus tracking target, the electronic device continues to record the video corresponding to the display area 902.

As shown in FIG. 2Q, the electronic device may display a user interface 1700. Controls included in the user interface 1700 are basically the same as the controls included in the user interface 1600. Based on the image displayed in the preview area 201, the person who is running reappears in the viewfinder range of the electronic device. In this case, the electronic device may re-detect the focus tracking target. In this case, the electronic device may continue to record the video corresponding to the display area 902.

In some embodiments of this application, after losing the focus tracking target for a period of time, the electronic device may continue to record the video corresponding to the preview area 201, and stop recording the video corresponding to the display area 902. That is, the electronic device closes a display window corresponding to the display area 902. In addition, before closing the display window corresponding to the display area 902, the electronic device may automatically save the video corresponding to the display area 902. In this case, the electronic device may continue to record the video corresponding to the preview area 201.

It may be understood that, similar to previewing, in the recording process, an interval from a time point at which the electronic device is out-of-focus to a time point at which the electronic device stops recording the video corresponding to the display area 902 may be set based on an actual requirement. This is not limited in this application.

In some embodiments of this application, after the electronic device is continuously out of focus and exits focus tracking, if the user does not re-determine the focus tracking target, once the electronic device re-detects the focus tracking target, the electronic device may re-open the display window corresponding to the display area 902 and re-record the focus tracking video.

6. Re-determining the Focus Tracking Target After Stopping Recording of a Focus Tracking Video, and Then Performing Recording of Focus Tracking (FIG. 2R to FIG. 2S)

The electronic device may detect a user operation performed on the video recording end control 9022 included in the user interface 900 as shown in FIG. 2I. In response to the user operation, the electronic device may display a user interface 1800 shown in FIG. 2R. The user interface 1800 may include a human body frame 402 and a human body frame 403. It may be understood that, in this case, the electronic device exits focus tracking, but still records the video corresponding to the preview area 201.

Figure 2R:
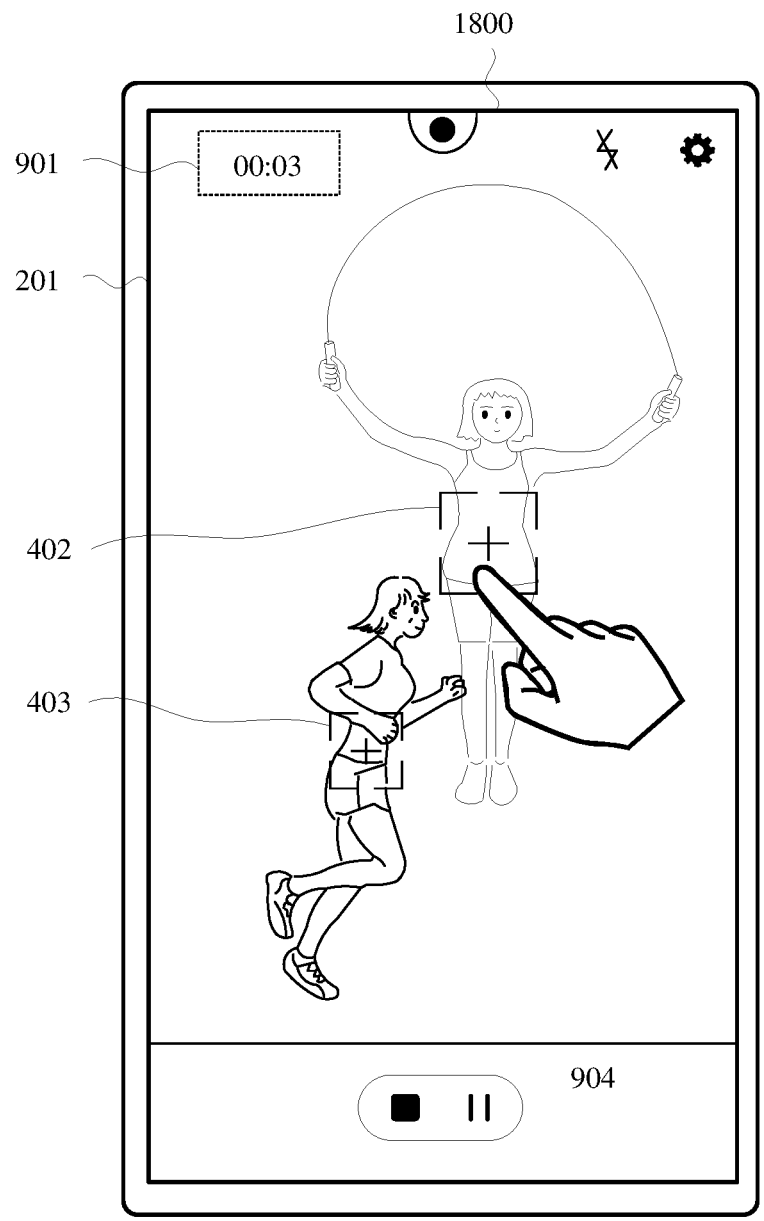

The electronic device may detect a user operation performed on the human body frame 402 included in the user interface 1800 as shown in FIG. 2R. In response to the user operation, the electronic device may re-determine a person corresponding to the human body frame 402 as the focus tracking target. The electronic device may record a focus tracking video with the focus tracking target as a subject.

Figure 2S:
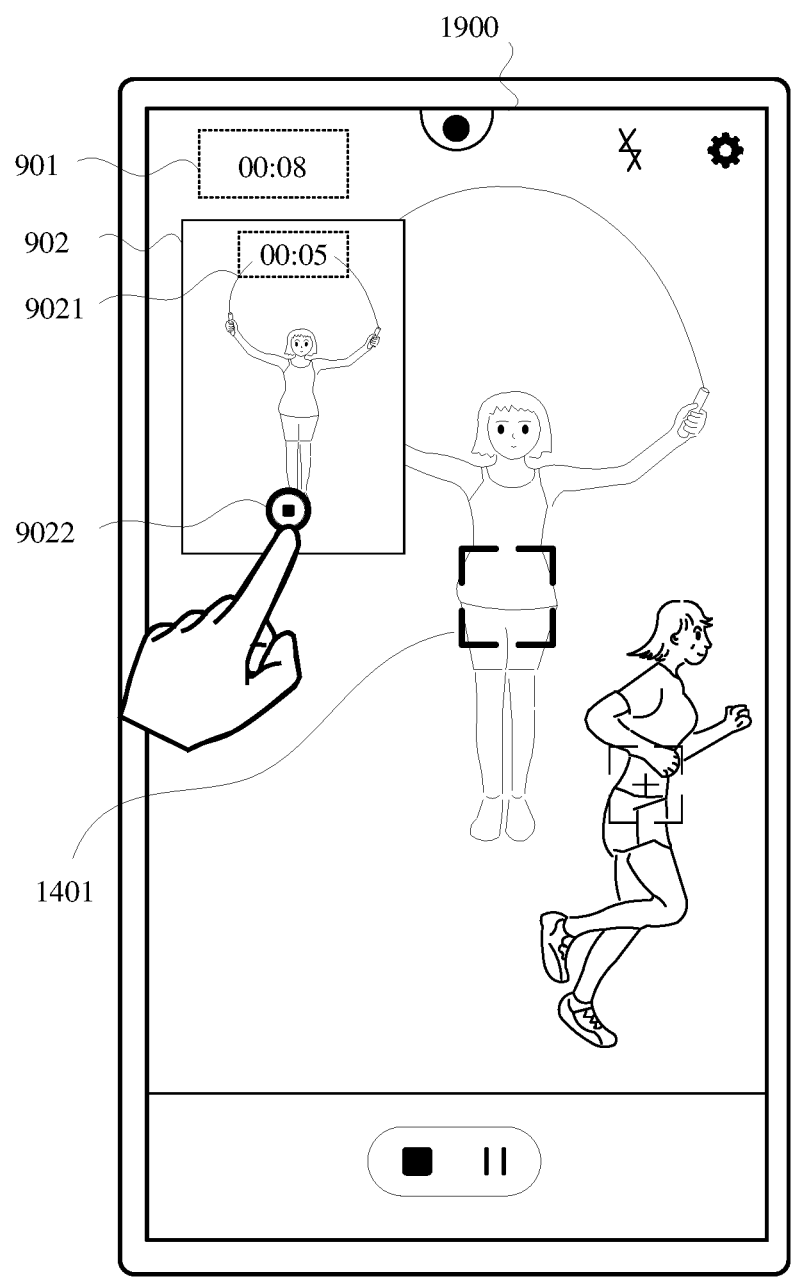

As shown in FIG. 2S, the electronic device may display a user interface 1900. Controls included in the user interface 1900 are basically the same as the controls included in the user interface 1400. A recording time of the video corresponding to the display area 901 included in the user interface 1900 is "00:08", and a recording time of the video corresponding to the display area 9021 in the display area 902 included in the user interface 1900 is "00:05". In other words, the video corresponding to the preview area 201 is recorded until an $8^{th}$ second, while the recording start time of the video corresponding to the display area 902 is little later, that is, the video is recorded until a $5^{th}$ second.

Figure 2T:
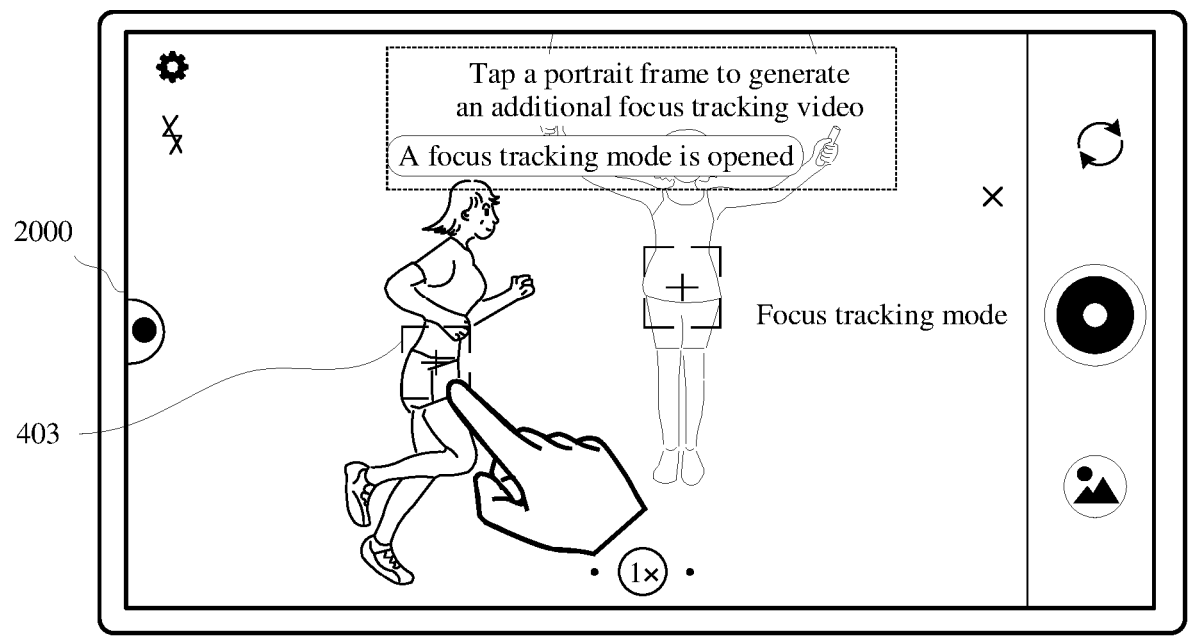
Figure 2U:
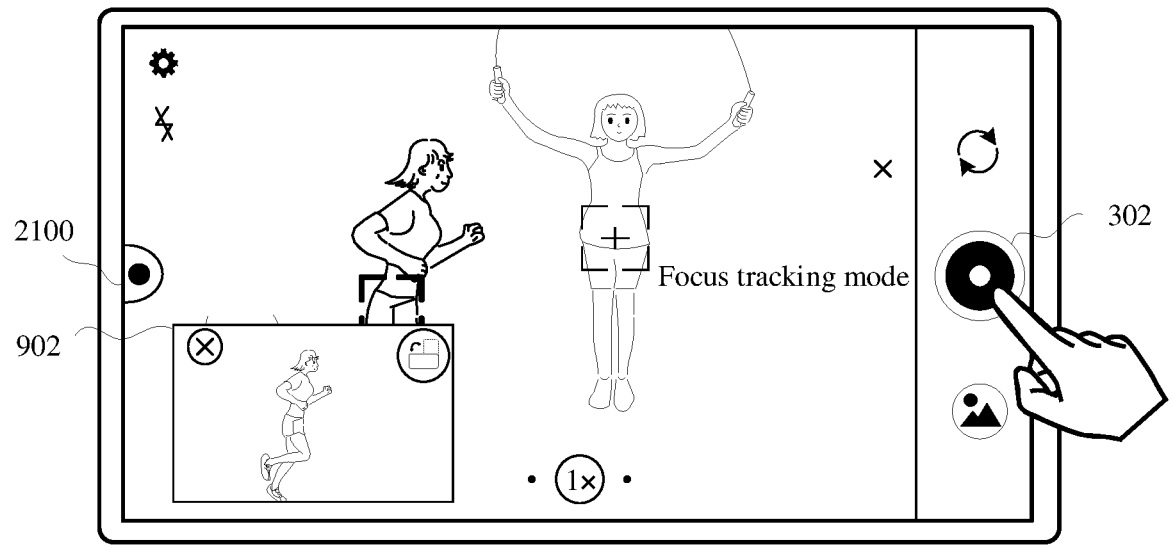
Figure 2V:
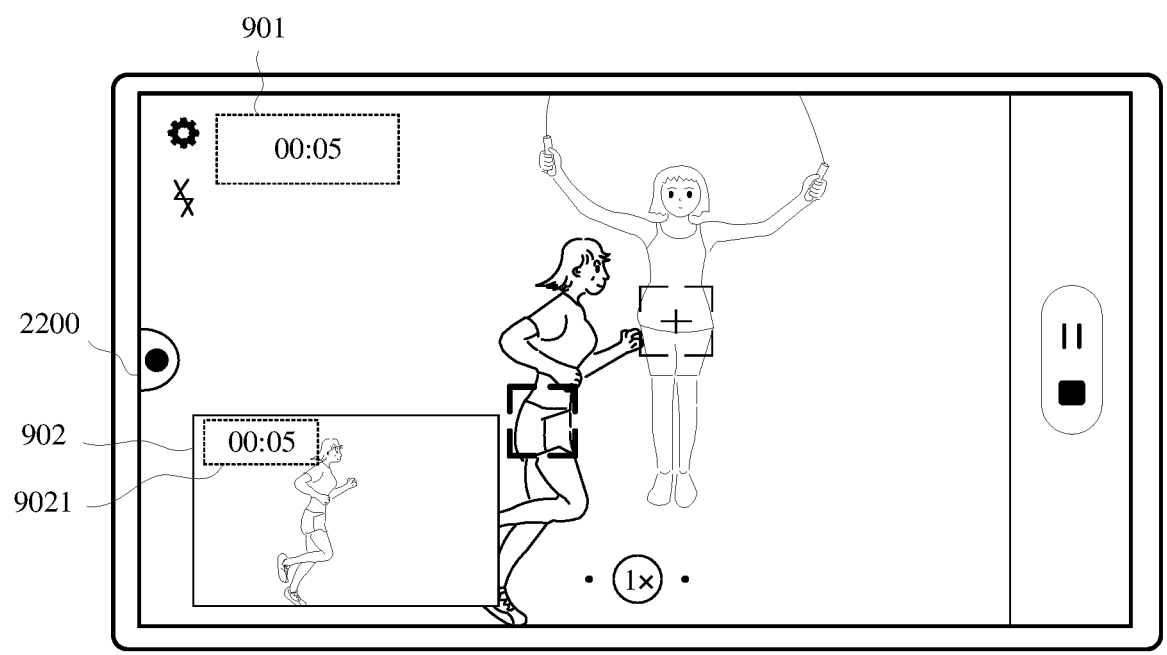

It may be understood that the electronic device may further perform previewing of focus tracking and recording of focus tracking in a landscape state. As shown in FIG. 2T, the electronic device may display a user interface 2000. Controls included in the user interface 2000 are basically the same as the controls included in the user interface 400. The electronic device may detect a user operation performed on a human body frame 403 included in the user interface 2000. In response to the user operation, the electronic device may display a user interface 2100 shown in FIG. 2U. The user interface 2100 may include a display area 902. The display area 902 is used to display the close-up picture of the focus tracking target. The electronic device may detect a user operation performed on a video recording start control 302 included in the user interface 2100. In response to the user operation, the electronic device may start to record the video. In a recording process, the electronic device may display a user interface 2200 shown in FIG. 2V.

It should be noted that, in the process in which the electronic device performs previewing of focus tracking and recording of focus tracking in the landscape state, the focus tracking target may be lost, and the focus tracking target may be switched. Details may be referred to the interface diagrams (for example, FIG. 2A to FIG. 2S) in a portrait state and not be described herein.

It should be noted that the foregoing user interfaces are only some examples provided in this application, and should not be regarded as limitations to this application. That is, the foregoing user interfaces may all display more or less content, which is not limited in this application.

The following describes a shooting method provided in an embodiment of this application.

Figure 3:
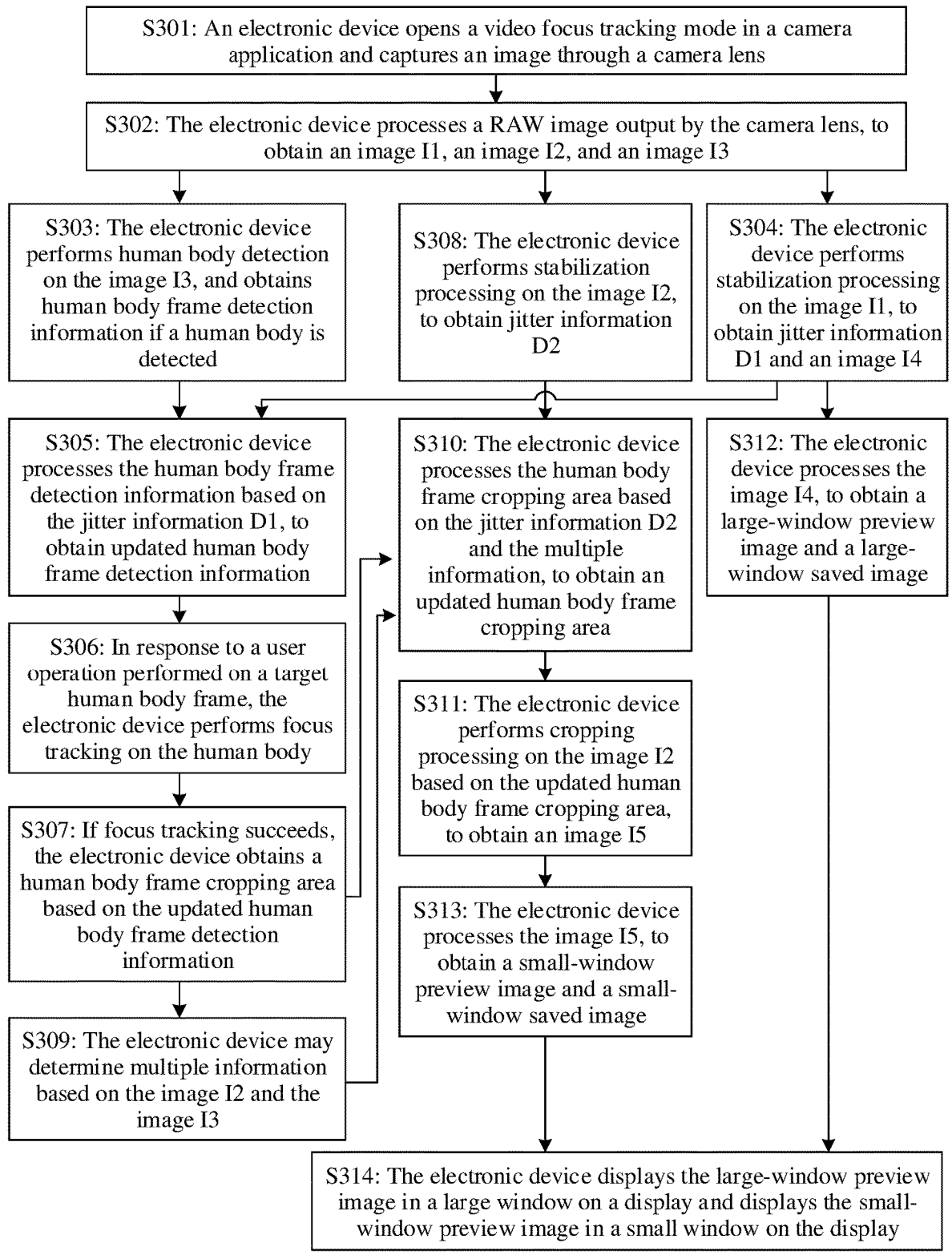
FIG. 3 is a flowchart of a shooting method according to an embodiment of this application.

FIG. 3 is a flowchart of a shooting method according to an embodiment of this application. The shooting method may include, but is not limited to, the following steps.

S301: An electronic device opens a video focus tracking mode in a camera application and captures an image through a camera lens.

Specifically, in response to a user operation performed on a camera application icon, the electronic device may start the camera application and display a photo shooting preview interface. In response to a user operation performed on a video recording mode option, the electronic device may enter a video recording mode and display a video recording preview interface. It may be understood that, after starting the camera application, the electronic device may capture an image in real time through the camera lens.

It may be understood that the video focus tracking mode is a focus tracking mode that is opened by the electronic device in a video recording preview state or a video recording start state.

S302: The electronic device processes a RAW image output by the camera lens, to obtain an image I1, an image I2, and an image I3.

Specifically, the electronic device may process the RAW image output by the camera lens to obtain an RGB image, process the RGB image to obtain a YUV image, and finally process the YUV image to obtain the image I1, the image I2, and the image I3. It may be understood that the image I1, the image I2, and the image I3 may all be YUV images.

It may be understood that the RAW image is raw data that a CMOS or CCD image sensor converts a captured light source signal into a digital signal, and is also referred to as a raw image file.

It may be understood that YUV is color space. YUV-based color coding is a common coding manner for streaming media. In the YUV color space, Y represents value, and U and V represent chroma (describing color and saturation). In some embodiments of this application, YUV is YCbCr. Actually, YCbCr is an altered version of YUV after zooming and offsetting, where Y represents lightness, and Cr and Cb represent chromatic aberration of a color, namely, components of red and blue respectively. YCbCr is used to describe a digital video signal, and is suitable for compression and transmission of a video and an image. YCbCr has a wide application field, and is used in JPEG, MPEG, and the like.

It should be noted that, in this application, a size of the image I1 is denoted as a size C1, a size of the image I2 is denoted as a size C2, and a size of the image I3 is denoted as a size C3. It may be understood that the size C2 is larger than the size C1, and the size C1 is larger than the size C3.

In some embodiments of this application, the size C1 is 1920 px*1,080 px, the size C2 is 3840 px*2160 px, and the size C3 is 640 px*320 px. It may be understood that a full name of px is "Pixel", which means "pixel" in Chinese, and is a smallest unit representing a picture or graph. It may be understood that the sizes C1, C2, and C3 may alternatively be other values. This is not limited in this application.

S303: The electronic device performs human body detection on the image I3, and if a human body is detected, and obtains human body frame detection information.

The electronic device may perform human body detection on the image I3. In addition, if the human body is detected, the electronic device may obtain human body frame detection information.

In some embodiments of this application, the electronic device may model the human body by using a geometric model of a location of a human body part, and perform human body detection based on the built model. For example, the electronic device may train models of a plurality of human body parts such as a neck, shoulders, and limbs, to obtain a general-purpose human body recognition model. In some other embodiments of this application, the electronic device may alternatively model the human body by using a filter convolution image or a target response, and perform human body detection based on the built model. Certainly, the electronic device may further perform human body detection in another manner. This is not limited in this application.

In some embodiments of this application, the electronic device needs to perform face detection before performing human body detection on the image I3. If there is a human face in the image I3, the electronic device performs human body detection on the image I3.

It may be understood that an image for performing face detection may be an RGB image, and the image I3 may be a YUV image.

For example, after capturing the RAW image through the camera lens, the electronic device may perform image effect processing in a RAW domain and an RGB domain on the RAW image, to obtain the RGB image. The electronic device may perform face detection based on the RGB image. In addition, the electronic device may further perform image effect processing in a YUV domain on the RGB image, to obtain a YUV image. The electronic device may further process the obtained YUV image, to obtain three different sizes of images, namely, the image I1, the image I2, and the image I3. The image I3 is the smallest image of the three different sizes of images. If the electronic device determines that there is a human face in the obtained RGB image, the electronic device may perform human body detection on the image I3.

The image effect processing in the RAW domain and the RGB domain includes conversion of the RAW image into an RGB image and then conversion of the RGB image into a YUV image. Specifically, the electronic device may convert the RAW image into a rawRGB image through an analog-to-digital converter, and then convert the rawRGB image into an RGB image.

The image effect processing in the YUV domain includes conversion of an original size of the YUV image into another size of the YUV image.

It may be understood that RGB is color space. In the RGB color space, a color image is generally represented by three components: red (Red, R), green (Green, G), and blue (Blue, B).

It may be understood that the human body frame detection information may include coordinates of the human body frame. It should be noted that the coordinates of the human body frame herein may be image coordinates of the human body frame in the image. The human body frame is used to frame the human body frame in the image. In some embodiments of this application, the human body frame may be a rectangular frame. Certainly, the human body frame may further be represented in another shape (for example, a triangle and the like). This is not limited in this application.

S304: The electronic device performs stabilization processing on the image I1, to obtain jitter information D1 and an image I4.

The electronic device may perform stabilization processing on the image I1, to obtain the jitter information D1 and the image I4. It may be understood that the jitter information may include a jitter offset, a jitter direction, and the like.

In some embodiments of this application, the electronic device may obtain jitter coordinates of the image from an acceleration sensor and a gyroscope sensor, and crop the original size of the image based on the jitter coordinates, to align coordinates of the image output before and after a jitter, and achieve visual smoothness. For example, jitter redundancy may be 20% of a width and height of the image. In other words, the electronic device may crop 20% of a width and height of the original size of the image.

It may be understood that for a specific implementation of the stabilization processing, refer to a relevant technical document. This is not expanded in this application.

For ease of description, a size of the image I4 in this application is denoted as a size C4. It may be understood that the size C4 may be set in advance by the electronic device. In some embodiments of this application, the size C4 is the same as the size C1.

S305: The electronic device processes the human body frame detection information based on the jitter information D1, to obtain updated human body frame detection information.

Specifically, the electronic device may process the coordinates of the human body frame included in the human body frame detection information (for example, an offset in an opposite direction) based on the jitter offset and the jitter direction included in the jitter information D1, to obtain the updated human body frame detection information.

S306: In response to a user operation performed on a target human body frame, the electronic device performs focus tracking on the human body.

A user may tap one of a plurality of human body frames displayed on a display of the electronic device. In response to the user operation, the electronic device may perform focus tracking on a person corresponding to the human body frame tapped by the user. For ease of description, in this application, a human body frame corresponding to a focusing tracking object that is selected by the user is denoted as a target human body frame. In addition, in this application, a human body frame corresponding to the focusing tracking object that is selected by the user after focusing tracking succeeds is denoted as a focusing tracking human body frame. It may be understood that display of a UI of the target human body frame and display of a UI of the focus tracking human body frame may be different (for example, color, a thickness of a line, a shape, and a size of the human body frame). For example, the human body frame 403 shown in FIG. 2D is the target human body frame, and display of the UI of the focus tracking human body frame 502 shown in FIG. 2E is different from display of the UI of the human body frame 403.

In some embodiments of this application, after detecting a tap event of the user performed on the target human body frame, the electronic device may obtain target human body frame information, and match the target human body frame information with the human body information. If the target human body frame information matches the human body detection information, the electronic device may determine that focus tracking succeeds.

In some embodiments of this application, when performing focus tracking on the human body, the electronic device may dynamically detect a change in the coordinates of the human body frame based on movement of the human body frame in the image.

S307: If focus tracking succeeds, the electronic device obtains a human body frame cropping area based on the updated human body frame detection information.

If focus tracking succeeds, the electronic device may find, among the coordinates of the human body frame included in the updated human body frame detection information, coordinates of the human body frame that match the human body frame included in the target human body frame information, and determine the human body frame cropping area based on the matched human body frame information. It may be understood that the human body frame cropping area may include coordinates of a human body frame corresponding to the focus tracking object.

In some embodiments of this application, if a difference between coordinates of most points included in coordinates of two human body frames is not greater than a preset threshold, the coordinates of the two human body frames are matched.

In some embodiments of this application, if a difference between coordinates of center points corresponding to the coordinates of the two human body frames is not greater than a preset threshold, and differences in lengths and differences in widths of human body frames corresponding to the coordinates of the two human body frames are greater than preset thresholds, the coordinates of the two human body frames are matched.

Certainly, the electronic device may further determine, in another manner, whether the coordinates of the human body frames are matched. This is not limited in this application.

S308: The electronic device performs stabilization processing on the image I2, to obtain jitter information D2.

The electronic device may perform stabilization processing on the image I2 and obtain jitter information. Related descriptions of stabilization processing and the jitter information may be referred to step S304 and not be described herein.

S309: The electronic device may determine multiple information based on the image I2 and the image I3.

The electronic device may determine the multiple information based on the size of the image I2 and the size of the image I3. That is, the electronic device may determine the multiple information based on the size C2 and the size C3. The multiple information may include a ratio of the size C2 to the size C3. It may be understood that the multiple information may be used to represent a difference between the size of the image I2 and the size of the image I3.

S310: The electronic device processes the human body frame cropping area based on the jitter information D2 and the multiple information, to obtain an updated human body frame cropping area.

The electronic device may process the coordinates of the human body frame included in the human body frame cropping area based on the jitter offset, the jitter direction, and the multiple information, to obtain the updated human body frame cropping area. Specifically, the electronic device may add a reverse jitter offset to the coordinates of the human body frame included in the human body frame cropping area, to coordinates obtain coordinates Z1 of the human body frame. It may be understood that the coordinates Z1 of the human body frame corresponds to coordinates on the image I3. The electronic device may combine the multiple information to convert the coordinates Z1 of the human body frame into coordinates Z2 of the human body frame. It may be understood that the coordinates Z2 of the human body frame corresponds to coordinates on the image I2.

S311: The electronic device performs cropping processing on the image I2 based on the updated human body frame cropping area, to obtain an image I5.

The electronic device may control a hardware module (for example, an image processing module) to crop the image I2 based on the updated human body frame cropping area, to obtain the image I5.

In some embodiments of this application, the electronic device may crop the image I2 with the human body frame cropping area as a center, to obtain an image that meets a size requirement, that is, the image I5.

In some embodiments of this application, the electronic device may crop the image I2, and retain only the updated human body frame cropping area, to obtain the image I5.

For ease of description, a size of the image I5 in this application is denoted as a size C5. It may be understood that the size C5 may be set in advance by the electronic device.

In some embodiments of this application, the size of the image I5 is the same as the size of the image I1. For example, the sizes of the image I5 and the image I1 are 1920 px*1,080 px.

S312: The electronic device processes the image I4 to obtain a large-window preview image and a large-window saved image.

It may be understood that the large-window preview image is a preview image displayed in a large window on a display after the electronic device implements focus tracking. The large-window saved image is an image saved by the electronic device in the focus tracking video.

In some embodiments of this application, a size of the large-window preview image is different from a size of the large-window saved image.

In some embodiments of this application, the large-window preview image may be a compressed thumbnail of the image I4, and the large-window saved image may be the image I4.

In some embodiments of this application, the electronic device may perform beauty processing on the image I4, and then process the obtained large-window preview image and the large-window saved image.

S313: The electronic device processes the image I5 to obtain a small-window preview image and a small-window saved image.

It may be understood that the small-window preview image is a preview image displayed in a small window on the display after the electronic device implements focus tracking. A saved image B2 is an image saved by the electronic device in the focus tracking video.

In some embodiments of this application, a size of the small-window preview image is different from a size of the small-window saved image.

In some embodiments of this application, the small-window preview image may be a compressed thumbnail of the image I5, and the small-window saved image may be the image I5.

In some embodiments of this application, the electronic device may perform beauty processing on the image I5, and then process the obtained large-window preview image and the large-window saved image.

S314: The electronic device displays the large-window preview image in the large window on the display and displays the small-window preview image in the small window on the display.

It may be understood that the electronic device may draw a large window on the display to display the large-window preview image, and draw a small window on the display to display the small-window preview image.

In some embodiments of this application, the electronic device may display, based on the updated human body detection frame information, a corresponding human body frame in a corresponding area of the display in which the large-window preview image is displayed.

It should be noted that, a sequence that the electronic device performs step S303, step S304, and step S308 is limited in this application. It is worth noting that the electronic device performs step S310 after performing step S307 and step S309. The electronic device performs step S305 after performing step S304.

It is worth noting that the shooting method as shown in FIG. 3 may further be applied to shooting another object and is not limited to shooting of a person. It may be understood that when the another object is shot by the method as shown in FIG. 3, similarly, the electronic device may perform step S301, step S302, step S304, step S308, step S309, and step S312 to step S314.

Similar to step S303, the electronic device may detect a shot object according to an object recognition algorithm. For example, the electronic device may build a model based on a feature of an object, and detect the shot object based on the model.

Similar to step S305, the electronic device may process, based on the dithering information, the detection information obtained when performing step S303, to obtain the updated detection information.

Similar to step S306, the electronic device may perform focus tracking on the focus tracking target selected by the user. For details, refer to descriptions related to focus tracking on the human body in step S306.

Similar to step S307, if focus tracking succeeds, the electronic device may obtain a shot object cropping area based on the updated detection information.

Similar to step S310, the electronic device may process the shot object cropping area based on the jitter information and the multiple information obtained when performing the foregoing steps, to obtain an updated shot object cropping area. Specifically, it may be understood that jitter correction is performed on the shot object cropping area, and adaptation processing is performed on a size of the shot object cropping area. The adaptation processing herein is mapping the coordinates included in the shot object cropping area from the size C3 (that is, the size of the image I3) to the size C2 (that is, the size of the image I2).

Similar to step S311, the electronic device may perform cropping processing on the image I2 based on the updated shot object cropping area, that is, kept, on the image I2, an area whose coordinates included in the updated shot object cropping area, and crop a remaining area is cropped.

It may be understood that the electronic device may further correct the detection information and the shot object cropping area in manners other than the stabilization processing. This is not limited in this application.

The following describes an apparatus revolved in an embodiment of this application.

Figure 4:
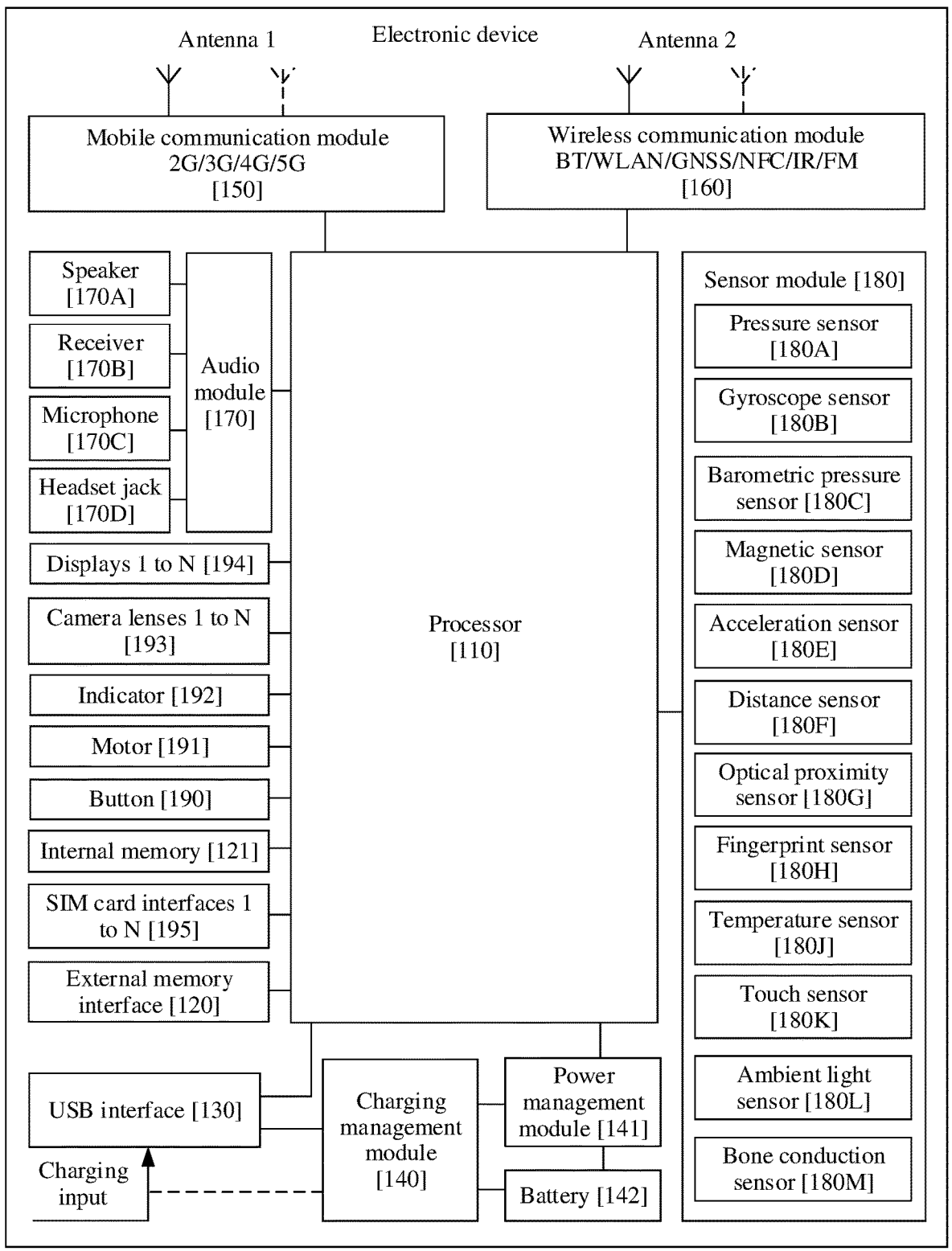
FIG. 4 is a schematic diagram of a hardware structure of an electronic device according to an embodiment of this application.

FIG. 4 is a schematic diagram of a hardware structure of an electronic device according to an embodiment of this application.

The electronic device may include a processor 110, an external memory interface 120, an internal memory 121, a universal serial bus (Universal Serial Bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera lens 193, a display 194, a subscriber identification module (Subscriber Identification Module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device. In some other embodiments of this application, the electronic device may include more or fewer components than those illustrated, some components may be combined, some components may be split, or a different component deployment may be used. The components in the portrait may be implemented by hardware, software, or a combination of software and hardware.

The processor 110 may include one or more processing units. For example, the processor 110 may include an application processor (Application Processor, AP), a modem processor, a graphics processing unit (Graphics Processing unit, GPU), an image signal processor (ISP), a controller, a memory, a video encoder and decoder, a digital signal processor (Digital Signal Processor, DSP), a baseband processor, a neural-network processing unit (Neural-network Processing Unit, NPU), and/or the like. Different processing units may be separate devices, or may be integrated into one or more processors.

A controller may be a nerve center and command center of the electronic device. The controller may generate an operation control signal based on instruction operation code and a time-sequence signal, and control obtaining and executing of instructions.

In an embodiment provided in this application, the electronic device may perform the shooting method through the processor 110.

A memory may be further arranged in the processor 110, which is configured to store instructions and data. In some embodiments the memory in processor 110 is a cache memory. The memory may store instructions or data recently used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

In some embodiments, the processor 110 may include one or more interfaces. The USB interface 130 is an interface that complies with the USB standard specification, and may be specifically a mini USB interface, a micro USB interface, a USB Type C interface, or the like. The interface included in the processor 110 may be further configured to connect to another electronic device, such as an AR device.

The charging management module 140 is configured to receive charging input from the charger. The charging management module 140 may supply power to the electronic device by the power management module 141 while charging the battery 142.

A wireless communication function of the electronic device may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device may be configured to cover a single communication frequency band or a plurality of communication frequency bands. Different antennas may be multiplexed to improve utilization of the antennas.

The mobile communication module 150 may provide a solution that includes wireless communication such as 2G/3G/4G/5G and that is applied to the electronic device.

The wireless communication module 160 may provide a wireless communication solution that is applied to the electronic device and that includes a wireless local area network (Wireless Local Area Networks, WLAN) (for example, a wireless fidelity (Wireless Fidelity, Wi-Fi) network), Bluetooth (Bluetooth, BT), a global navigation satellite system (Global Navigation Satellite System, GNSS), frequency modulation (Frequency Modulation, FM), a near field communication (Near Field Communication, NFC) technology, an infrared (Infrared, IR) technology, and the like.

In some embodiments, the antenna 1 and the mobile communication module 150 in the electronic device are coupled, and the antenna 2 and the wireless communication module 160 are coupled, so that the electronic device can communicate with a network and another device by using a wireless communication technology.

The electronic device implements a display function through the GPU, the display 194, and the application processor. The GPU is a microprocessor for image processing and is connected to the display 194 and the application processor. The GPU is configured to perform mathematical and geometric calculations and graphics rendering. The processor 110 may include one or more GPUs, and the GPU executes program instructions to generate or change display information.

The display 194 is configured to display, for example, an image and a video. The display 194 may include a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flex Light-Emitting Diode, FLED), a mini-LED, a micro-LED, a micro-OLED, a quantum dot light emitting diode (Quantum Dot Light Emitting Diodes, QLED), or the like. In some embodiments, the electronic device may include 1 or N displays 194. N is a positive integer greater than 1.

The electronic device may implement an obtaining function by using the ISP, the camera lens 193, the video encoder and decoder, the GPU, the display 194, the application processor, and the like.

The ISP is configured to handle data returned by the camera lens 193. For example, when a photo is shot, a shutter is enabled, light is transmitted to a camera lens photosensitive element through a lens, an optical signal is converted into an electrical signal, and the camera lens photosensitive element transmits the electrical signal to the ISP for processing, to convert the electrical signal into an image or a video visible to a naked eye. The ISP may also perform algorithm optimization on a noise point, brightness, and color of an image. The ISP may further optimize parameters such as exposure and a color temperature of a shooting scenario. In some embodiments, the ISP may be disposed in the camera lens 193.

The camera lens 193 is configured to capture a still image or a video. An optical image of an object is generated through a lens and is projected onto a photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transfers the electrical signal to the ISP to convert the electrical signal into a digital image or a video signal. The ISP outputs the digital image or the video signal to the DSP for processing. The DSP converts the digital image or the video signal into an image or a video signal in a standard format, for example, RGB or YUV.

The digital signal processor is configured to process a digital signal. In addition to processing a digital image or video signal, the digital signal processor may further process another digital signal. For example, when the electronic device selects a frequency, the digital signal processor is configured to perform Fourier transform on frequency energy.

The video encoder and decoder are configured to compress or decompress a digital video. The electronic device may support one or more video encoders and decoders. In this way, the electronic device may play or record videos in a plurality of encoding formats, for example, moving picture experts group (Moving Picture Experts Group, MPEG)1, MPEG2, MPEG3, and MPEG4.

The external memory interface 120 may be configured to be connected to an external memory card, for example, a Micro SD card, to expand a storage capacity of the electronic device. The external memory card communicates with the processor 110 through the external memory interface 120, to implement a data storage function. For example, music files, video files, and other files are stored in the external memory card.

The internal memory 121 may be configured to store computer-executable program code. The executable program code includes instructions. The processor 110 runs the instructions stored in the internal memory 121, to perform various functional applications and data processing of the electronic device. The internal memory 121 may include a program storage area and a data storage area. The program storage area may store an operating system, an application required by at least one function (for example, a sound playback function or an image/video playback function), and the like. The data storage area may store data (for example, audio data and a phone book) created during use of the electronic device, and the like.

The electronic device may implement an audio function through the audio module 170, the speaker 170A, the receiver 170B, the microphone 170C, the headset jack 170D, the application processor, and the like. The audio function includes, for example, music playing and sound recording.

The sensor module 180 may include one or more sensors, and these sensors may be of a same type or different types. It may be understood that, the sensor module 180 shown in FIG. 4 is merely an example division manner, and there may be another division manner. This is not limited in this application.

The pressure sensor 180A is used to sense a pressure signal, and can convert the pressure signal into an electrical signal. In some embodiments, the pressure sensor 180A may be arranged in the display 194. When a touch operation is performed on the display 194, the electronic device detects a strength of the touch operation by using the pressure sensor 180A. The electronic device may also calculate a touch location based on a detection signal of the pressure sensor 180A. In some embodiments, touch operations performed at a same touch location but having a different touch operation strength may correspond to different operation instructions.

The gyroscope sensor 180B may be configured to determine a motion posture of the electronic device. In some embodiments, an angular velocity of the electronic device around three axes (namely, an x axis, a y axis, and a z axis) may be determined by using the gyroscope sensor 180B. The gyroscope sensor 180B may be used for image stabilization during shooting.

The acceleration sensor 180E may detect magnitudes of acceleration of the electronic device in various directions (generally on three axes). When the electronic device is static, magnitude, and a direction of gravity may be detected. The acceleration sensor may be further configured to recognize a posture of the electronic device, and is applied to applications such as switching between landscape and portrait modes and a pedometer.

The distance sensor 180F is configured to measure a distance. The electronic device may measure a distance through infrared or laser. In some embodiments, in a shooting scenario, the electronic device may measure a distance through the distance sensor 180F, to implement quick focusing.

The touch sensor 180K is also called a "touch panel". The touch sensor 180K may be disposed on the display 194. The touch sensor 180K and the display 194 form a touchscreen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor may provide, by using the display 194, visual output related to the touch operation. In some other embodiments, the touch sensor 180K may alternatively be disposed on a surface of the electronic device at a position different from that of the display 194.

The barometric pressure sensor 180C is configured to measure an air pressure. The magnetic sensor 180D may include a Hall sensor. The optical proximity sensor 180G may include, for example, a light-emitting diode (LED) and a light detector, for example, a photodiode. The electronic device detects infrared reflected light from a nearby object through the photodiode. The ambient light sensor 180L is configured to perceive ambient light brightness. The fingerprint sensor 180H is configured to obtain a fingerprint. The temperature sensor 180J is configured to detect a temperature. The bone conduction sensor 180M may obtain a vibration signal.

The button 190 includes an on/off key, a volume key, or the like. The button 190 may be a mechanical button or a touch button. The electronic device may receive key input and generate key signal input related to user settings and function control of the electronic device. The motor 191 may generate a vibration prompt. The motor 191 may be configured to provide a vibration prompt for an incoming call, and may be further configured to provide vibration feedback for a touch. The indicator 192 may be an indicator light, may be configured to indicate a charging status or a change in charge, and may be further configured to indicate a message, a missed incoming call, a notification, and the like. The SIM card interface 195 is used for connecting a SIM card.

Figure 5:
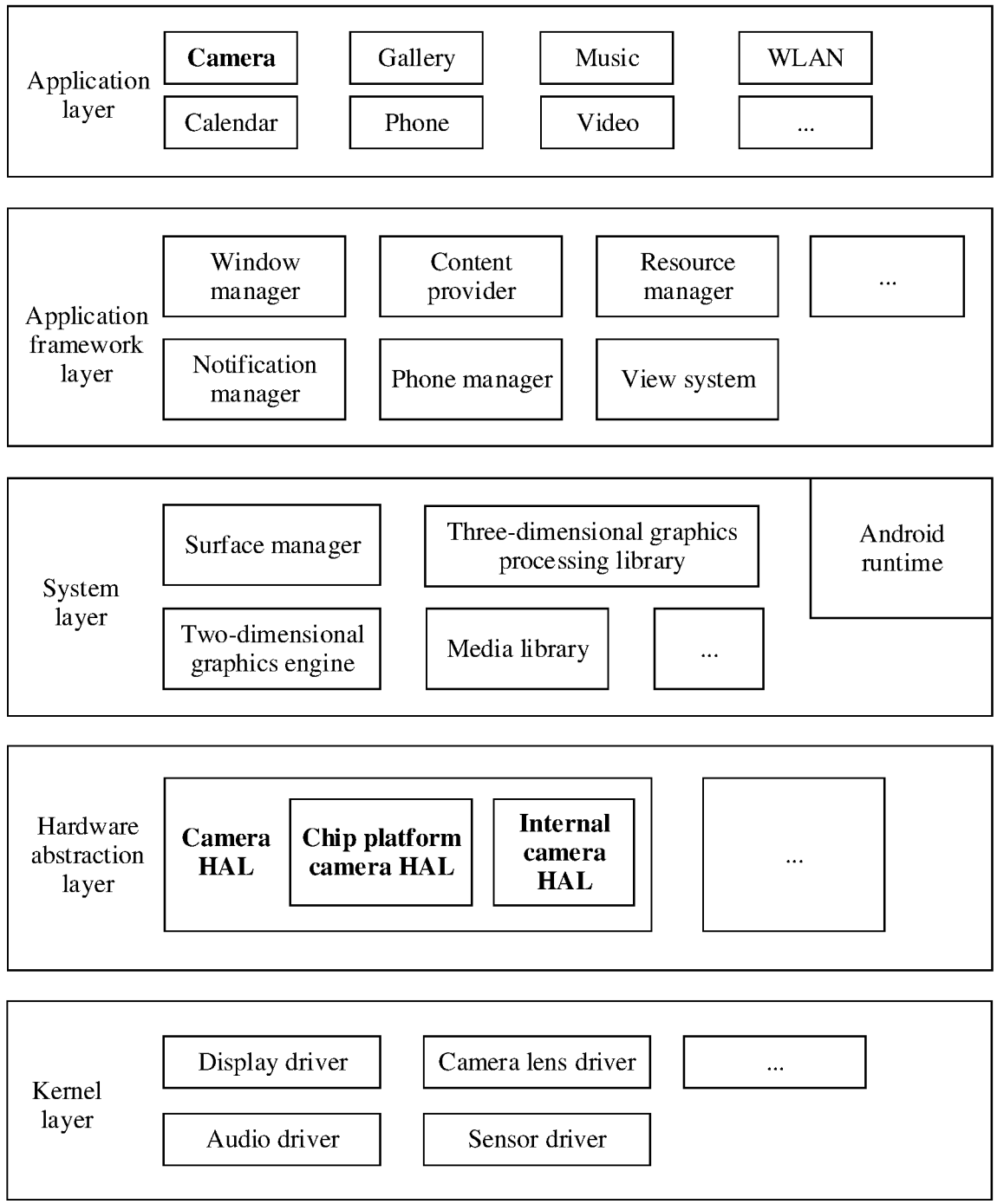
FIG. 5 is a schematic diagram of a software structure of an electronic device according to an embodiment of this application.

FIG. 5 is a schematic diagram of a software structure of an electronic device according to an embodiment of this application.

As shown in FIG. 5, a software framework of the electronic device in this application may include an application program layer, an application framework layer (framework, FWK), a system library, an Android runtime, a hardware abstraction layer, and a kernel layer (kernel).

The application layer may include a series of application packages, such as a camera, a gallery, a calendar, a phone, a map, navigation, WLAN, Bluetooth, music, a video, messaging, and other application programs (also referred to as applications). The camera is configured to capture an image and a video. For other applications of the application layer, reference may be made to description and explanation in conventional technologies, which is not described in this application. In this application, an application on the electronic device may be a native application (for example, an application installed in the electronic device when an operating system is installed before the electronic device is delivered from a factory), or may be a third-party application (for example, an application downloaded from an AppGallery and installed by a user). This is not limited in this embodiment of this application.

The application framework layer provides an application programming interface (Application Programming Interface, API) and a programming framework for applications at the application layer. The application framework layer includes some predefined functions.

As shown in FIG. 5, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, perform screen capturing, and so on.

The content provider is configured to store and obtain data, so that the data can be accessed by an application. The data may include a video, an image, an audio, calls made and answered, a browsing history and bookmarks, an address book, and the like.

The view system includes a visual control such as a control for text display or a control for picture display. The view system may be configured to create an application program. A display interface may be formed by one or more views. For example, a display interface including a short message notification icon may include a view for displaying text and a view for displaying a picture.

The phone manager is configured to provide a communication function of the electronic device, for example, management of a call state (including answering, declining, or the like).

The resource manager provides the application with various resources such as a localized string, an icon, an image, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top state bar of the system in a form of a graph or a scroll bar text, for example, a notification of an application running on the background, or may be a notification that appears on the screen in a form of a dialog interface. For example, text information is prompted on a status bar, a prompt tone is made, the electronic device vibrates, or an indicator light flashes.

Runtime (Runtime) includes a kernel library and a virtual machine. The Runtime is responsible for scheduling and managing the system.

The kernel library includes two parts: a performance function that needs to be invoked by a programming language (for example, java language), and a system kernel library.

The application program layer and the application framework layer are run in the virtual machine. The virtual machine executes programming files (for example, Java files) of the application layer and the application framework layer as binary files. The virtual machine is configured to perform functions such as lifecycle management of an object, stack management, thread management, security and exception management, and garbage collection.

The system library may include a plurality of functional modules, for example, a surface manager (Surface Manager), a media library (Media Libraries), a three-dimensional graphics processing library (for example, OpenGL ES), and a two-dimensional graphics engine (for example, SGL).

The surface manager is configured to manage a display subsystem and provides fusion between a two-dimensional (2-Dimensional, 2D) layer and a three-dimensional (3-Dimensional, 3D) layer for a plurality of application programs.

The media library supports playback and recording of a plurality of common audio and video formats, a still image file, and the like. The media library may support a plurality of audio and video encoding formats, such as MPEG4, H.264, MP3, AAC, AMR, JPG, PNG, and the like.

The three-dimensional graphics processing library is used for implementing 3D graphics drawing, image rendering, composition, layer processing, and the like.

The 2D graphics engine is a drawing engine for 2D drawings.

The hardware abstraction layer (HAL) is an interface layer between an operating system kernel and upper layer software, and is intended to abstract hardware. The hardware abstraction layer is an abstraction interface driven by a device kernel, and is used to provide an application programming interface for accessing an underlying device to a higher-level Java API framework. The HAL includes a plurality of library modules, such as a camera HAL, a display, Bluetooth, and audio. Each library module implements an interface for a specific type of hardware component. When a system framework layer API is required to access hardware of a portable device, an Android operating system loads the library module for the hardware component.

It is worth noting that camera HAL may include a chip platform camera HAL and an internal camera HAL.

The kernel layer is a basis of the Android operating system, and a function of the Android operating system is finally completed through the kernel layer. The kernel layer includes at least a display driver, a camera lens driver, an audio driver, a sensor driver, and a virtual card driver.

It should be noted that the schematic diagram of the software structure of the electronic device shown in FIG. 5 provided in this application is only an example, and does not limit specific module division in different layers of the Android operating system. For details, refer to the description of the software structure of the Android operating system in conventional technologies. In addition, the shooting method provided in this application may also be implemented based on another operating system, which is not listed one by one in this application.

Figure 6:
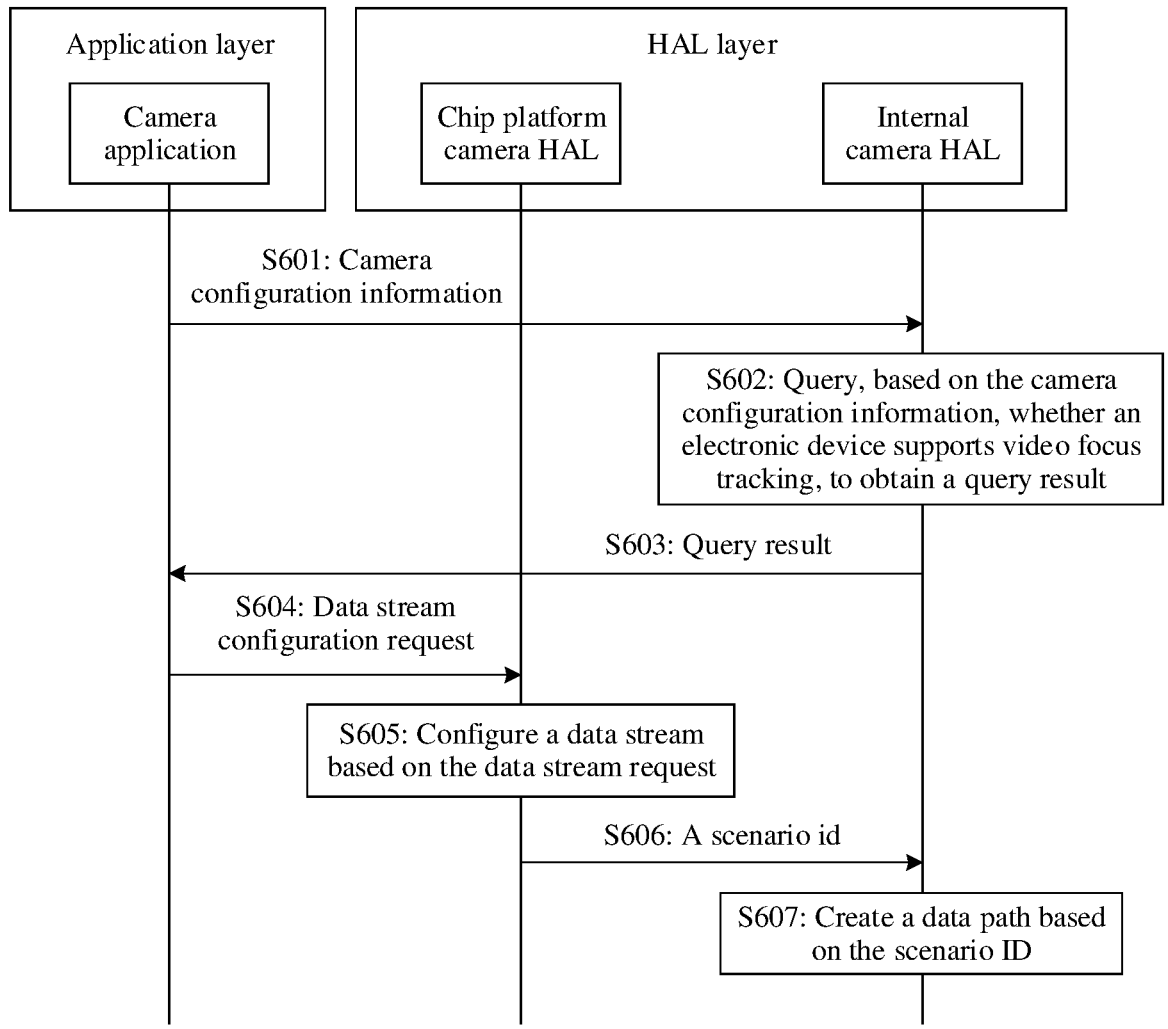
FIG. 6 is another flowchart of a shooting method according to an embodiment of this application.
Figure 7A:
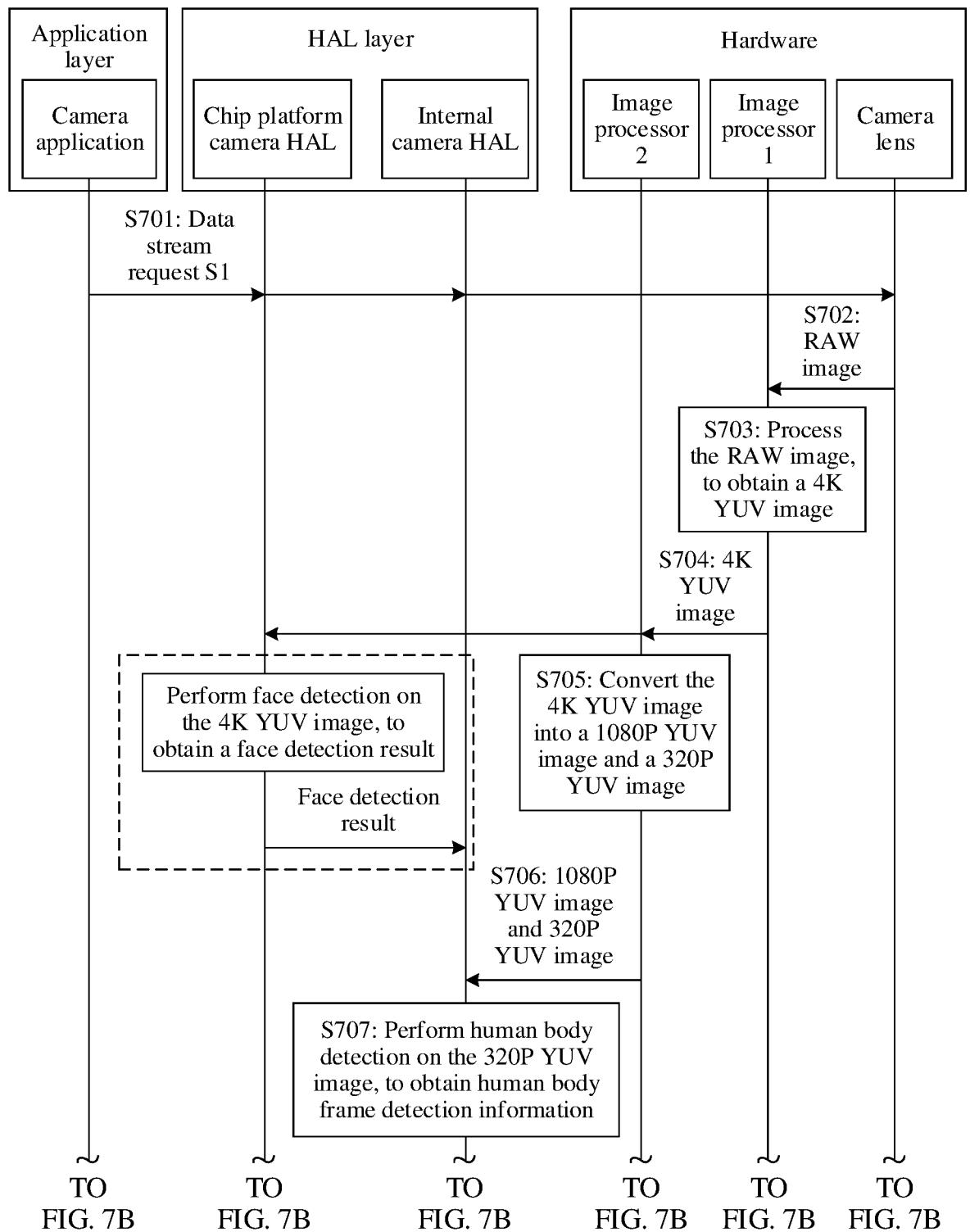
FIG. 7A and FIG. 7B is another flowchart of a shooting method according to an embodiment of this application.
Figure 7B:
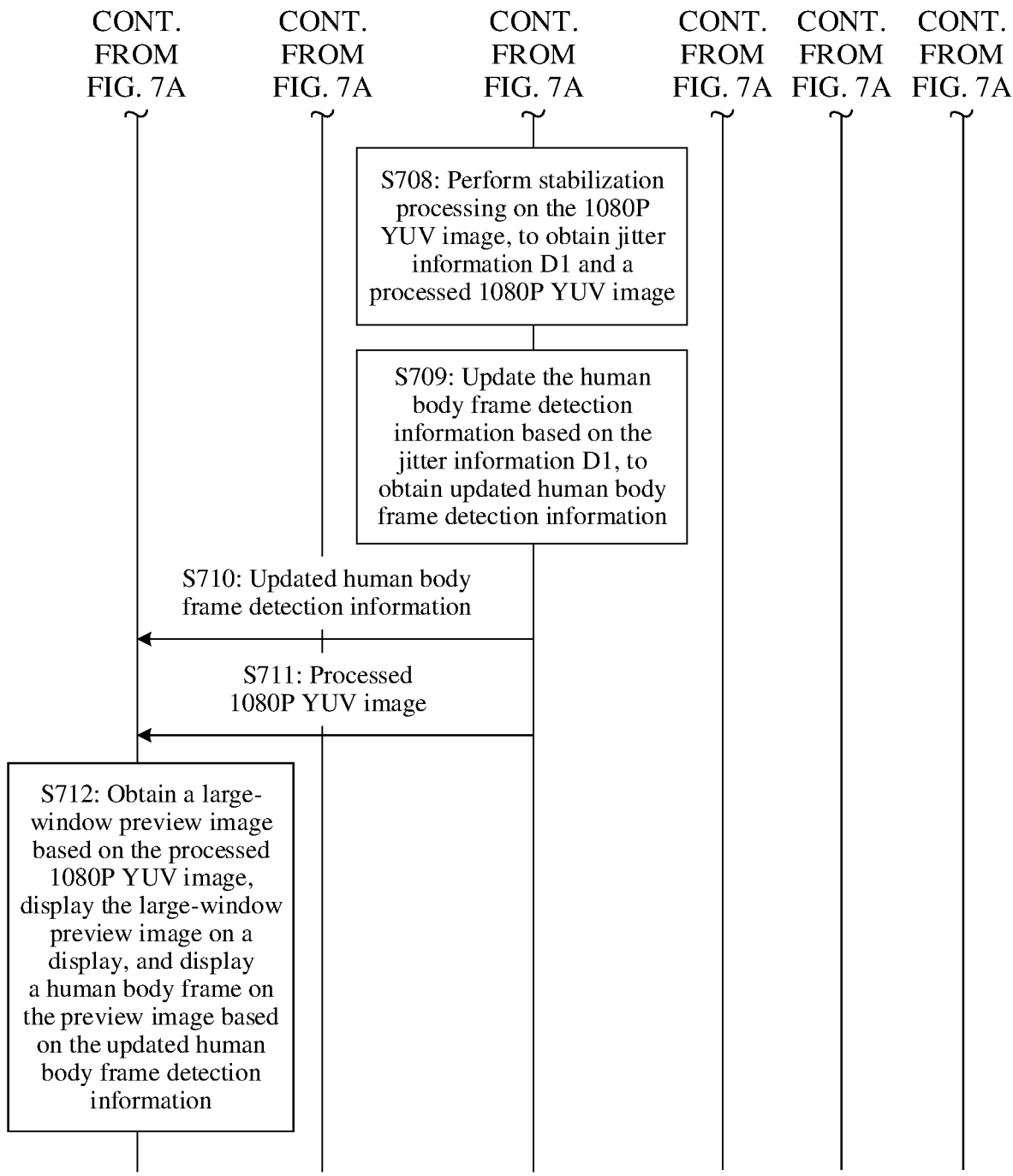
Figure 8B:
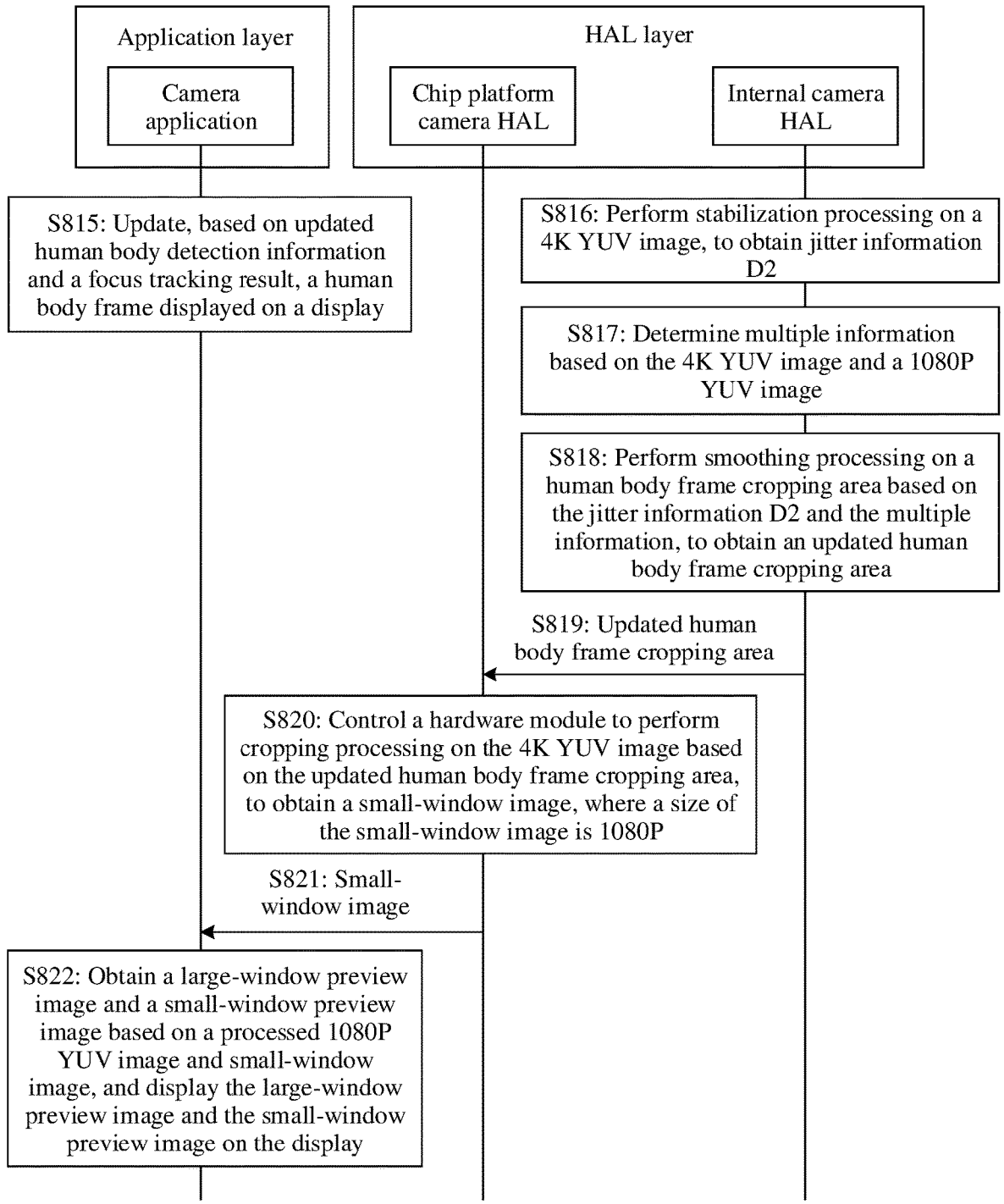
FIG. 8B is another flowchart of a shooting method according to an embodiment of this application.

The following describes a specific implementation of the foregoing embodiments based on structures of apparatuses shown in FIG. 4 and FIG. 5 with reference to FIG. 6, FIG. 7A and FIG. 7B, FIG. 8A(1) and FIG. 8A(2), and FIG. 8B.

I. Configuring a Data Stream (As Shown in FIG. 6)

A user may tap a camera application icon, and accordingly, an electronic device may detect the tap event performed on the camera application icon, determine a user request, and open a camera. Further, the data stream is prepared to be configured in the electronic device.

S601: A camera application sends camera configuration information to a HAL layer.

It may be understood that the camera application may send the camera configuration information to a chip platform camera HAL and an internal camera HAL in the HAL layer. The camera configuration information may include a logical camera ID.

Accordingly, the chip platform camera HAL and the internal camera HAL in the HAL layer may receive the camera configuration information sent by the camera application.

S602: The internal camera HAL in the HAL layer queries, based on the camera configuration information, whether the electronic device supports video focus tracking, to obtain a query result.

It may be understood that after the HAL layer obtains related camera configuration information, the internal camera HAL in the HAL layer may query, through capability query, whether a static capability report of a focus tracking algorithm is supported, and obtains a query result.

In some embodiments of this application, if the query result is 0, it indicates that the electronic device does not support video focus tracking. If the query result is 1, it indicates that the electronic device supports video focus tracking. Certainly, the query result may be in another form. This is not limited in this application.

S603: The internal camera HAL may send the query result to the camera application.

Accordingly, the camera application may receive the query result sent by the internal camera HAL, and analyze the query result to determine whether the electronic device supports video focus tracking.

S604: The camera application sends a data stream configuration request to the chip platform camera HAL.

The camera application sends the data stream configuration request to the chip platform camera HAL. It may be understood that, if the electronic device supports video focus tracking, the data stream configuration request is used to request for configuration of four paths of data streams. The four paths of data streams include two paths of preview streams and two paths of video streams.

In some embodiments of this application, the data stream configuration request may include a data stream identifier.

For example, the data stream configuration request may include: pre1, pre2, vid1, and vid2. pre1 represents an identifier of a large-window preview stream, and pre2 represents an identifier of a small-window preview stream. The large-window preview stream is used to provide a preview image displayed in a large window. The small-window preview stream is used to provide a preview image displayed in a small window. vid1 and vid2 are identifiers of video streams corresponding to pre1 and pre2 respectively.

It may be understood that the large window is used to display a preview image corresponding to a raw video. The small window is used to display a preview image corresponding to a focus tracking video. For example, the large window may be the preview area 201 shown in FIG. 2E, the small window may be the display area 501 shown in FIG. 2E, and the small window may also be the display area 902 shown in FIG. 2I.

Accordingly, the chip platform camera HAL may receive the data stream configuration request sent by the camera application.

S605: The chip platform camera HAL configures the data stream based on the data stream request.

Specifically, after receiving the data stream configuration request sent by the camera application, the chip platform camera HAL may parse the data stream configuration request, and determine a quantity and type of data streams to be configured by the chip platform camera HAL.

If the data stream configuration request is used to request the configuration of the four paths of data streams (the two paths of preview streams and the two paths of video streams), the chip platform camera HAL configures the two paths of preview streams and the two paths of video streams. The two paths of preview streams may have corresponding identifiers, namely, pre1 and pre2. Similarly, the two paths of video streams may have corresponding identifiers, namely, vid1 and vid2.

S606: The chip platform camera HAL sends a scenario ID to the camera HAL. The scenario ID indicates a scenario mode.

Accordingly, the camera HAL may receive the scenario ID sent by the chip platform camera HAL.

S607: The camera HAL creates a data path based on the scenario ID.

The camera HAL may create the data path based on the scenario ID. For example, when the scenario ID is 2, it indicates that the electronic device has entered a focus tracking mode, but the user does not determine a focus tracking target. In this case, the camera HAL may create data paths corresponding to pre1 and vid1. When the scenario ID is 3, it indicates that the electronic device has entered the focus tracking mode, and the user has determined the focus tracking target. In this case, the camera HAL may create data paths corresponding to pre1, pre2, vid1, and vid2.

II. Enabling Preview (As Shown in FIG. 7A and FIG. 7B)

The user may tap a focus tracking mode control, and accordingly, the electronic device may detect the tap event performed on the focus tracking mode control, determine a user request, and enter the focus tracking mode. Further, the camera application starts requesting a data stream.

S701: The camera application sends a data stream request S1 to the HAL layer.

The camera application may send the data stream request S1 to the chip platform camera HAL and the internal camera HAL of the HAL layer. It may be understood that the data stream request S1 may include pre1.

Accordingly, the internal camera HAL may receive the data stream request S1, and parse the data stream request S1 to determine a quantity and type of data streams requested by the camera application. Specifically, the internal camera HAL may parse the data stream request S1, obtain pre1, and determine, based on pre1, that the camera application requests for a large-window preview stream.

It may be understood that, before performing step S701, when the user triggers and opens the camera application, the camera application may request to start a camera lens. Accordingly, after receiving the request, the camera lens may acquire data.

S702: The camera lens sends a RAW image to an image processor 1.

It may be understood that the camera lens may send the captured RAW image to the image processor 1.

Accordingly, the image processor 1 may receive the RAW image sent by the camera lens.

S703: The image processor 1 processes the RAW image, to obtain a 4K YUV image.

It may be understood that 4K generally is a 4K resolution. The 4K resolution is that a quantity of pixels in each row in a horizontal direction are or are close to 4,096, regardless of an aspect ratio. Depending on a different usable range, there are various derivative resolutions of the 4K resolution, such as 4096 px*3112 px for Full Aperture 4K, 3656 px*2664 px for Academy 4K, and 3840 px*2160 px for a UHDTV standard, which are all in a range of the 4K resolution.

In some embodiments of this application, the 4K YUV image is a YUV image with a size of 3840 px*2160 px.

S704: The image processor 1 sends the 4K YUV image to an image processor 2.

Accordingly, the image processor 2 may receive the 4K YUV image sent by the image processor 1.

In some embodiments of this application, the image processor 1 may not only send the 4K YUV image to the image processor 2, but may further send the 4K YUV image to the chip platform camera HAL.

S705: The image processor 2 converts the 4K YUV image into a 1080P YUV image and a 320P YUV image.

It may be understood that the image processor 2 may convert the 4K YUV image into a 1080P YUV image and a 320P YUV image. The 1080P YUV image is a YUV image with a size of 1920 px*1,080 px. The 320P YUV image is a YUV image with a size of 640 px*320 px.

It may be understood that the 1080P YUV image may be the image I1 in the foregoing embodiment. The 4K YUV image may be the image I2 in the foregoing embodiment. The 320P YUV image may be the image I3 in the foregoing embodiment.

In some embodiments of this application, the electronic device may process the RAW image based on more or fewer image processors, to obtain different sizes of YUV images.

S706: The image processor 2 sends the 1080P YUV image and the 320P YUV image to the internal camera HAL.

Accordingly, the internal camera HAL may receive the 1080P YUV image and the 320P YUV image sent by the image processor 2.

It should be noted that the electronic device may perform step S703 to step S706 based on the more or fewer image processors.

In some embodiments of this application, regardless of whether the data stream requested by the camera application is a preview stream or a video stream, a hardware module may capture the image and process the image, to obtain a plurality of sizes of images, and may send the plurality of sizes of images back to the HAL. Accordingly, after receiving the plurality of sizes of images, HAL may determine, select, and process a corresponding size of the image based on the data stream request.

S707: The internal camera HAL performs human body detection on the 320P YUV image, to obtain human body frame detection information.

In some embodiments of this application, before the internal camera HAL performs human body detection, the chip platform camera HAL may perform face detection on the 4K YUV image to obtain a face detection result. The chip platform camera HAL may send the face detection result to the internal camera HAL, and the internal camera HAL may receive and parse the face detection result. If there is a human face in the 4K YUV image after parsing, the internal camera HAL performs human body detection. It may be understood that a form of the face detection result is not limited to text, numbers, strings, and the like.

It may be understood that, related descriptions of step S707 may be referred to step S303 and not be described herein.

S708: The internal camera HAL performs stabilization processing on the 1080P YUV image, to obtain jitter information D1 and a processed 1080P YUV image.

It may be understood that the processed 1080P YUV image herein may be the image I4 in the foregoing embodiment.

It may be understood that related descriptions of step S708 may be referred to step S304 and not be described herein.

It should be noted that a sequence of step S707 to step S708 is not limited in this application.

S709: The internal camera HAL updates the human body frame detection information based on the jitter information D1, to obtain updated human body frame detection information.

It may be understood that related descriptions of step S709 may be referred to step S305 and not be described herein.

S710: The internal camera HAL sends the updated human body frame detection information to the camera application.

Accordingly, the camera application may receive the updated human body frame detection information sent by the internal camera HAL.

S711: The internal camera HAL sends the processed 1080P YUV image to the camera application.

It should be noted that performing time of step S711 may be earlier than performing time of step S712, but later than performing time of step S708. In other words, the electronic device may process step S711 and step S707 to step S710 in parallel.

S712: The camera application obtains a large-window preview image based on the processed 1080P YUV image, displays the large-window preview image on the display, and displays the human body frame on the preview image based on the updated human body frame detection information.

It may be understood that the updated human body frame detection information may include coordinates of the human body frame.

It may be understood that related descriptions of step S712 may be referred to step S312 and not be described herein.

III. Starting Focus Tracking and Obtaining a Focus Tracking Result (Step S801 to S814 Shown in FIG. 8A(1) and FIG. 8A(2))

The user may tap a target human body frame, and accordingly, the electronic device may detect the tap event performed on the target human body frame, determine a user request, and perform focus tracking. Further, the camera application starts requesting a data stream.

S801: The camera application sends a data stream request S2 to the HAL layer.

The camera application may send the data stream request S2 to the chip platform camera HAL and the internal camera HAL of the HAL layer. It may be understood that the data stream request S2 may include pre1 and pre2.

Accordingly, the internal camera HAL may receive the data stream request S2 and parse the data stream request S2, to determine a quantity and type of data streams requested by the camera application. Specifically, the internal camera HAL may parse the data stream request, obtain pre1 and pre2, and determine, based on pre1 and pre2, that the camera application requests for a large-window preview stream and a small-window preview stream.

S802: The camera application sends target human body frame information to the internal camera HAL.

It may be understood that the target human body frame information may include coordinates of a target human body frame. Specifically, the camera application may determine the coordinates of the target human body frame based on a tap location of the user, and send the coordinates to the HAL for subsequent processing.

S803: The camera lens sends a RAW image to the image processor 1.

S804: The image processor 1 processes the RAW image, to obtain a 4K YUV image.

S805: The image processor 1 sends the 4K YUV image to the image processor 2.

S806: The image processor 2 converts the 4K YUV image into a 1080P YUV image and a 320P YUV image.

It may be understood that related descriptions of step S803 to step S806 may be referred to step S702 to step S705 and not be described herein.

S807: The image processor 2 sends the 4K YUV image, the 1080P YUV image, and the 320P YUV image to the internal camera HAL.

Accordingly, the internal camera HAL may receive the 4K YUV image, the 1080P YUV image, and the 320P YUV image sent by the image processor 2.

S808: The internal camera HAL performs human body detection on the 320P YUV image, to obtain human body frame detection information.

S809: The internal camera HAL performs stabilization processing on the 1080P YUV image, to obtain jitter information D1 and a processed 1080P YUV image.

S810: The internal camera HAL updates the human body frame detection information based on the jitter information D1, to obtain updated human body frame detection information.

S811: The internal camera HAL sends the updated human body frame detection information to the camera application.

S812: The internal camera HAL sends the processed 1080P YUV image to the camera application.

It may be understood that related descriptions of step S808 to step S812 may be referred to step S707 to step S711 and not be described herein.

S813: The internal camera HAL performs determining on focus tracking based on the target human body frame information and the updated human body frame detection information, to obtain a focus tracking result and a human body frame cropping area.

It may be understood that related descriptions of step S813 may be referred to step S306 and not be described herein.

S814: The internal camera HAL sends the focus tracking result to the camera application.

Accordingly, the camera application may receive the focus tracking result sent by the internal camera HAL, parse the focus tracking result, and determine whether focus tracking succeeds.

In some embodiments of this application, the focus tracking result may be expressed as a figure. For example, when the focus tracking result is 0, it indicates that focus tracking fails. When the focus tracking result is 1, it indicates that the focus tracking succeeds. When the focus tracking result is 2, it indicates that the focus tracking target is lost. Certainly, the focus tracking result may further be in other forms of text, a character string, and the like. This is not limited in this application.

If focus tracking fails, the camera application may send a request for closing the small window to the HAL layer, and stop requesting for pre2. It may be understood that the camera application may continue to perform step S712.

IV. Focus Tracking Succeeds (Step S815 to Step S822 Shown in FIG. 8B)

If the camera application determines, based on the focus pursuit result, that focus tracking succeeds, the electronic device may continue to perform the following steps.

S815: The camera application updates, based on the updated human body detection information and the focus tracking result, the human body frame displayed on the display.

It may be understood that, if focus tracking succeeds, the camera application may change display of a UI of the target human body frame, that is, update the human body frame on the display. Details may be referred to the foregoing embodiments, and not be described herein.

In some embodiments of this application, if focus tracking succeeds, the internal camera HAL may perform automatic focusing. That is, a focus is automatically locked on the focus tracking target.

S816: The internal camera HAL performs stabilization processing on the 4K YUV image, to obtain the jitter information D2.

It may be understood that related descriptions of step S816 may be referred to step S308 and not be described herein.

S817: The internal camera HAL determines multiple information based on the 4K YUV image and the 1080P YUV image.

It may be understood that related descriptions of step S817 may be referred to step S309 and not be described herein.

S818: The internal camera HAL performs smoothing processing on the human body frame cropping area based on the jitter information D2 and the multiple information, to obtain an updated human body frame cropping area.

It may be understood that related descriptions of step S818 may be referred to step S310 and not be described herein.

S819: The internal camera HAL sends the updated human body frame cropping area to the chip platform camera HAL.

Accordingly, the chip platform camera HAL may receive the updated human body frame cropping area sent by the internal camera HAL.

S820: The chip platform camera HAL controls a hardware module to perform cropping processing on the 4K YUV image based on the updated human body frame cropping area, to obtain a small-window image. A size of the small-window image is 1080P.

It may be understood that related descriptions of step S820 may be referred to step S311 and not be described herein.

S821: The chip platform camera HAL sends the small-window image to the camera application.

Accordingly, the camera application may receive the small-window image sent by the chip platform camera.

S822: The camera application obtains a large-window preview image and a small-window preview image based on the processed 1080P YUV image and the small-window image, and displays the large-window preview image and the small-window preview image on the display.

It may be understood that the processed 1080P YUV image may be the image I4 in the foregoing embodiment, and the small-window image may be the image I5 in the foregoing embodiment.

It may be understood that related descriptions of step S822 may be referred to step S312 to step S314 and not be described herein.

The foregoing embodiments are merely intended for describing the technical solutions of this application, but not for limiting this application. Although this application is described in detail with reference to the foregoing embodiments, a person of ordinary skill in the art should understand that the person of ordinary skill may still make modifications to the technical solutions described in the foregoing embodiments or make equivalent replacements to some technical features thereof, without departing from the scope of the technical solutions of embodiments of this application.

The invention claimed is:

1. A shooting method, applied to an electronic device with a camera lens, wherein the method comprises:
displaying a shooting interface, wherein the shooting interface comprises a preview area, and the preview area is used to display an image captured by the camera lens, and
the shooting interface comprises a first image and a first control;
detecting a first operation performed on the first control;
in response to the first operation, displaying one or more markers on the first image, wherein the one or more markers are used to mark a shot object in the first image;
detecting a second operation performed on a first marker, wherein the first marker is used to mark a first shot object;
in response to the second operation, displaying a first window on the preview area of the shooting interface, wherein the first window displays a close-up image of the first shot object, and the shooting interface comprises a recording control;
detecting a third operation performed on the recording control;
in response to the third operation, starting, by the electronic device, recording a video; and
displaying a first recording time on the shooting interface, wherein the first window displays a second recording time.

2. The method according to claim 1, wherein before the detecting a second operation performed on a first marker, the method further comprises:
processing a RAW image captured by the camera lens to obtain a second image and a third image, wherein a size of the second image is larger than a size of the third image;
performing stabilization processing on the second image to, obtain first jitter information, wherein the first jitter information comprises a first jitter offset and a first jitter direction;
performing object recognition on the third image according to an object recognition algorithm, and obtaining first object recognition information, wherein the first object recognition information comprises coordinates of one or more shot objects; and
processing the first object recognition information based on the first jitter information, to obtain second object recognition information, wherein coordinates of one or more shot objects comprised in the second object recognition information are used to display the one or more markers on the first image.

3. The method according to claim 2, wherein after the detecting a second operation performed on a first marker, the method comprises:
obtaining operation information of the second operation;
determining a focus tracking target and coordinates of the focus tracking target based on the operation information of the second operation and the second object recognition information, wherein the focus tracking target is the first shot object, and coordinates of the first shot object match the operation information of the second operation; and
determining a first cropping area based on the coordinates of the focus tracking target, wherein the close-up image is an image generated based on the first cropping area.

4. The method according to claim 3, wherein the method further comprises:
processing the RAW image captured by the camera lens to obtain a fourth image;
performing stabilization processing on the fourth image, to obtain second jitter information, wherein the second jitter information comprises a second jitter offset and a second jitter direction;
determining multiple information based on the fourth image and the third image, wherein the multiple information comprises a ratio of the fourth image to the third image;
processing the first cropping area based on the second jitter information and the multiple information, to obtain a second cropping area; and
cropping the fourth image based on coordinates comprised in the second cropping area, to obtain a fifth image, wherein the close-up image is an image generated based on the fifth image.

5. The method according to claim 4, wherein the processing the first cropping area based on the second jitter information and the multiple information, to obtain a second cropping area specifically comprises:
performing, based on the second jitter offset, offset processing on coordinates comprised in the first cropping area in a direction opposite to the second jitter direction, to obtain a third cropping area; and
zooming in the third cropping area based on the multiple information, to obtain the second cropping area.

6. The method according to claim 5, wherein the processing the first cropping area based on the second jitter information and the multiple information, to obtain a second cropping area; and the cropping the fourth image based on coordinates comprised in the second cropping area, to obtain a fifth image specifically comprises:
processing, by an internal camera hardware abstraction layer (HAL) in the electronic device, the first cropping area based on the second jitter information and the multiple information, to obtain the second cropping area;
sending, by the internal camera HAL, the second cropping area to a chip platform camera HAL in the electronic device; and
cropping, by the chip platform camera HAL, the fourth image based on the coordinates comprised in the second cropping area, to obtain the fifth image.

7. The method according to claim 6, wherein after obtaining the fifth image, the method further comprises:
performing compression processing on the fifth image, to obtain the close-up image of the first shot object.

8. The method according to claim 7, wherein after the performing stabilization processing on the second image, the method further comprises: obtaining a sixth image; and
performing compression processing on the sixth image, to obtain an image currently displayed in the preview area.

9. The method according to claim 8, wherein after the performing stabilization processing on the second image, the method further comprises: obtaining a sixth image; and
performing compression processing on the sixth image, to obtain an image currently displayed in the preview area.

10. The method according to claim 4, wherein the processing the first cropping area based on the second jitter information and the multiple information, to obtain a second cropping area; and the cropping the fourth image based on coordinates comprised in the second cropping area, to obtain a fifth image specifically comprises:

processing, by an internal camera hardware abstraction layer (HAL) in the electronic device, the first cropping area based on the second jitter information and the multiple information, to obtain the second cropping area;

sending, by the internal camera HAL, the second cropping area to a chip platform camera HAL in the electronic device; and cropping, by the chip platform camera HAL, the fourth image based on the coordinates comprised in the second cropping area, to obtain the fifth image.

11. The method according to claim 10, wherein after obtaining the fifth image, the method further comprises:

performing compression processing on the fifth image, to obtain the close-up image of the first shot object.

12. The method according to claim 4, wherein after obtaining the fifth image, the method further comprises:

performing compression processing on the fifth image, to obtain the close-up image of the first shot object.

13. The method according to claim 2, wherein after the performing stabilization processing on the second image, the method further comprises: obtaining a sixth image; and performing compression processing on the sixth image, to obtain an image currently displayed in the preview area.

14. An electronic device, comprising a camera lens, a display, a memory, and one or more processors, wherein the memory is configured to store a computer program, and the processor is configured to invoke the computer program, to enable the electronic device to perform:

displaying a shooting interface, wherein the shooting interface comprises a preview area, and the preview area is used to display an image captured by the camera lens, and the shooting interface comprises a first image and a first control;

detecting a first operation performed on the first control;

in response to the first operation, displaying one or more markers on the first image, wherein the one or more markers are used to mark a shot object in the first image;

detecting a second operation performed on a first marker, wherein the first marker is used to mark a first shot object;

in response to the second operation, displaying a first window on the preview area of the shooting interface, wherein the first window displays a close-up image of the first shot object, and the shooting interface comprises a recording control;

detecting a third operation performed on the recording control;

in response to the third operation, starting, by the electronic device, recording a video; and displaying a first recording time on the shooting interface, wherein the first window displays a second recording time.

15. The electronic device according to claim 14, wherein the processor is configured to invoke the computer program, to enable the electronic device further to perform:

processing a RAW image captured by the camera lens to obtain a second image and a third image, wherein a size of the second image is larger than a size of the third image;

performing stabilization processing on the second image to, obtain first jitter information, wherein the first jitter information comprises a first jitter offset and a first jitter direction;

performing object recognition on the third image according to an object recognition algorithm, and obtaining first object recognition information, wherein the first object recognition information comprises coordinates of one or more shot objects; and processing the first object recognition information based on the first jitter information, to obtain second object recognition information, wherein coordinates of one or more shot objects comprised in the second object recognition information are used to display the one or more markers on the first image.

16. The electronic device according to claim 15, wherein the processor is configured to invoke the computer program, to enable the electronic device further to perform:

obtaining operation information of the second operation;

determining a focus tracking target and coordinates of the focus tracking target based on the operation information of the second operation and the second object recognition information, wherein the focus tracking target is the first shot object, and coordinates of the first shot object match the operation information of the second operation; and determining a first cropping area based on the coordinates of the focus tracking target, wherein the close-up image is an image generated based on the first cropping area.

17. The electronic device according to claim 16, wherein the processor is configured to invoke the computer program, to enable the electronic device further to perform:

processing the RAW image captured by the camera lens to obtain a fourth image;

performing stabilization processing on the fourth image, to obtain second jitter information, wherein the second jitter information comprises a second jitter offset and a second jitter direction;

determining multiple information based on the fourth image and the third image, wherein the multiple information comprises a ratio of the fourth image to the third image;

processing the first cropping area based on the second jitter information and the multiple information, to obtain a second cropping area; and cropping the fourth image based on coordinates comprised in the second cropping area, to obtain a fifth image, wherein the close-up image is an image generated based on the fifth image.

18. The electronic device according to claim 17, wherein the processing the first cropping area based on the second jitter information and the multiple information, to obtain a second cropping area specifically comprises:

performing, based on the second jitter offset, offset processing on coordinates comprised in the first cropping area in a direction opposite to the second jitter direction, to obtain a third cropping area; and zooming in the third cropping area based on the multiple information, to obtain the second cropping area.

19. The electronic device according to claim 18, wherein the processing the first cropping area based on the second jitter information and the multiple information, to obtain a second cropping area; and the cropping the fourth image based on coordinates comprised in the second cropping area, to obtain a fifth image specifically comprises:

processing, by an internal camera hardware abstraction layer (HAL) in the electronic device, the first cropping area based on the second jitter information and the multiple information, to obtain the second cropping area;

sending, by the internal camera HAL, the second cropping area to a chip platform camera HAL in the electronic device; and cropping, by the chip platform camera HAL, the fourth image based on the coordinates comprised in the second cropping area, to obtain the fifth image.

20. A non-transitory computer-readable storage medium, comprising computer instructions, wherein when the computer instructions are run on an electronic device, the electronic device is enabled to perform:

displaying a shooting interface, wherein the shooting interface comprises a preview area, and the preview area is used to display an image captured by the camera lens, and the shooting interface comprises a first image and a first control;

detecting a first operation performed on the first control;

in response to the first operation, displaying one or more markers on the first image, wherein the one or more markers are used to mark a shot object in the first image;

detecting a second operation performed on a first marker, wherein the first marker is used to mark a first shot object;

in response to the second operation, displaying a first window on the preview area of the shooting interface, wherein the first window displays a close-up image of the first shot object, and the shooting interface comprises a recording control;

detecting a third operation performed on the recording control;

in response to the third operation, starting, by the electronic device, recording a video; and displaying a first recording time on the shooting interface, wherein the first window displays a second recording time.

* * * * *